United States Patent
Nonogaki et al.

(10) Patent No.: US 9,688,871 B2
(45) Date of Patent: Jun. 27, 2017

(54) INKJET RECORDING INK AND INK CARTRIDGE USING THE INK, INKJET RECORDING APPARATUS, INKJET RECORDING METHOD AND INK RECORDING MATTER

(71) Applicants: Masayasu Nonogaki, Shizuoka (JP); Keita Katoh, Shizuoka (JP); Minoru Hakiri, Shizuoka (JP); Mitsuru Naruse, Shizuoka (JP); Akihiko Matsuyama, Shizuoka (JP); Kazukiyo Nagai, Shizuoka (JP); Yuusuke Koizuka, Shizuoka (JP); Nobuyuki Sakamoto, Ibaraki (JP); Yosuke Matsuoka, Ibaraki (JP); Masatomo Takahashi, Ibaraki (JP)

(72) Inventors: Masayasu Nonogaki, Shizuoka (JP); Keita Katoh, Shizuoka (JP); Minoru Hakiri, Shizuoka (JP); Mitsuru Naruse, Shizuoka (JP); Akihiko Matsuyama, Shizuoka (JP); Kazukiyo Nagai, Shizuoka (JP); Yuusuke Koizuka, Shizuoka (JP); Nobuyuki Sakamoto, Ibaraki (JP); Yosuke Matsuoka, Ibaraki (JP); Masatomo Takahashi, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 569 days.

(21) Appl. No.: 14/202,284

(22) Filed: Mar. 10, 2014

(65) Prior Publication Data

US 2014/0267516 A1    Sep. 18, 2014

(30) Foreign Application Priority Data

Mar. 14, 2013 (JP) .................................. 2013-051457
Mar. 14, 2013 (JP) .................................. 2013-051460

(51) Int. Cl.
*C09D 11/32* (2014.01)
*C09D 11/324* (2014.01)
(Continued)

(52) U.S. Cl.
CPC ............ *C09D 11/324* (2013.01); *C09D 11/32* (2013.01); *C09D 11/322* (2013.01); *C09D 11/326* (2013.01)

(58) Field of Classification Search
CPC ...................................................... C09D 11/00
See application file for complete search history.

(56) References Cited

U.S. PATENT DOCUMENTS 5,938,829 A * 8/1999 Higashiyama ......... C09D 11/30
106/31.58

FOREIGN PATENT DOCUMENTS

| JP | 2002-201378 | 7/2002 |
| JP | 2002-249684 | 9/2002 |

(Continued)

OTHER PUBLICATIONS

Machine Translation of JP 2002-249684.*
(Continued)

*Primary Examiner* — Gerard Higgins
*Assistant Examiner* — Sathavaram I Reddy
(74) *Attorney, Agent, or Firm* — Cooper & Dunham LLP

(57) ABSTRACT

An inkjet recording ink, including: water; a water-soluble solvent; a pigment; and a phosphate group-containing copolymer, wherein the phosphate group-containing copolymer includes a structural unit represented by the following general formula (1) and a structural unit represented by the following general formula (2):

(Continued)

General formula (1)

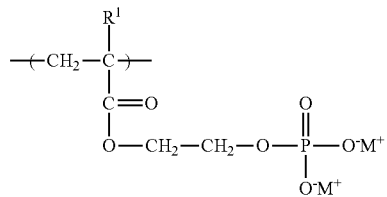

wherein, in the general formula (1), $R^1$ represents either of a hydrogen atom and a methyl group; and $M^+$ represents any of an alkali metal ion, an organic amine ion and a hydrogen ion, one-half or more of the $M^+$ in the copolymer is an alkali metal ion or an organic amine, and the remainder is a hydrogen ion;

General formula (2)

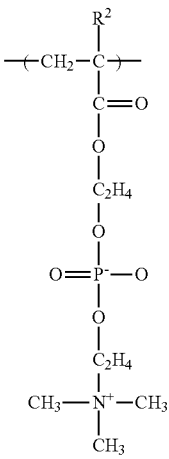

wherein, in the general formula (2), $R^2$ represents either of a hydrogen atom and a methyl group.

5 Claims, 4 Drawing Sheets

(51) Int. Cl.
C09D 11/322 (2014.01)
C09D 11/326 (2014.01)

(56) References Cited

FOREIGN PATENT DOCUMENTS

| JP | 2003-147236 | 5/2003 |
| JP | 2007-70567 | 3/2007 |
| JP | 2008-184567 | 8/2008 |
| JP | 2011-122072 | 6/2011 |
| JP | 4765176 | 6/2011 |
| JP | 5013801 | 5/2012 |

OTHER PUBLICATIONS

Machine Translation of JP 2007-070567.*
Mar. 24, 2015 Chinese official action in corresponding Chinese patent application No. 201410097753.9.

* cited by examiner

INKJET RECORDING INK AND INK CARTRIDGE USING THE INK, INKJET RECORDING APPARATUS, INKJET RECORDING METHOD AND INK RECORDING MATTER

BACKGROUND OF THE INVENTION

Field of the Invention

The present invention relates to an inkjet recording ink (hereinafter may be simply referred to as "ink"), and an ink cartridge using the ink, an inkjet recording apparatus, an inkjet recording method and an ink recorded matter.

Description of the Related Art

In recent years, as an image forming method, an inkjet recording method has come into wide use because the inkjet recording method is simpler in process and easier in printing in full color mode as compared to other methods, and has an advantage such that high resolution images can be obtained even with apparatuses simple in constitution.

The inkjet recording method is such that small quantities of ink are allowed to fly by using bubbles generated by heat or by using pressures generated, for example, by a piezoelectric element or static electricity, and to attach onto a recording medium such as paper and to be dried rapidly or to penetrate into the recording medium so as to form an image; the use of the inkjet recording method has expanded so as to cover personal and industrial printers and printing.

In an inkjet recording apparatus, aqueous inks using water-soluble dyes as pigments are used, and the dye inks involve drawbacks of being poor in weather resistance and water resistance. Accordingly, recently, there have been advanced researches on pigment inks using pigments in place of water soluble dyes. However, the pigment inks are, as compared to dye inks, still poorer in terms of color developing property, ink ejection stability and ink storage stability.

The improvement of the high image quality achieving technique of OA printers requires pigment inks to give image densities comparable with the image densities given by dye inks even for plain paper as a recording medium. However, when plain paper is used as recording media, pigment inks penetrate into the sheets of paper so as to lower the image density on the surface of the sheets of paper, and thus cause a problem such that the image density is lowered.

Recently, the demand for the inkjet recording apparatus in industrial applications has been increased, and the achievement of high speed printing in the inkjet recording apparatus is desired. The achievement of high speed printing leads to the proposal of inkjet printers having a line head. For the purpose of increasing the drying rate of the ink adhering onto a recording medium in order to achieve high speed printing, a technique is adopted in which a penetrating agent is added to the ink to facilitate the penetration of the water in the ink into the recording medium so as to promote the drying of the ink; however, in this case, the penetrability of the pigment as well as the penetrability of water is enhanced to cause a phenomenon of further decreasing the image density.

For the improvement of the image density, various methods have been proposed. For example, an ink has been proposed which is used for recording on paper, including a water-soluble multivalent metal salt (Japanese Patent Application Laid-Open (JP-A) No. 2011-122072). The ink based on this proposal include a pigment (a) and at least a compound (b) having no surface activity, having a molecular weight of 150 or more and 10,000 or less, wherein the content of phosphorus ((P content/molecular weight)×100) derived from the functional group selected from the functional group whose basic skeleton is phosphoric acid and the functional group whose basic skeleton is phosphonic acid in the molecular structure of the compound is 1.4 or more, and the content of the (b) compound is 1.5% by mass or more and 10.0% by mass or less in relation to the total mass of the ink.

However, the method of the foregoing proposal results in an insufficient improvement of the image density for plain paper having a low content of the water-soluble multivalent metal salt. The use of the compound having the functional group selected from the functional group whose basic skeleton is phosphoric acid and the functional group whose basic skeleton is phosphonic acid improves the image density, but causes a problem such that the dispersion condition of the pigment in the ink comes to be unstable.

Accordingly, it is desired to provide an inkjet recording ink plain paper, capable of achieving the compatibility between the high image density on plain paper and the improvement of the storage stability and the ejection stability of the ink.

SUMMARY OF THE INVENTION

The present invention takes as its object the provision of an inkjet recording ink, capable of giving a high image density on plain paper and satisfactory in the storage stability and the ejection stability of the ink.

The inkjet recording ink of the present invention, for achieving the foregoing object includes water, a water-soluble solvent, a pigment and a phosphate group-containing copolymer, wherein the phosphate group-containing copolymer includes a structural unit represented by the following general formula (1) and a structural unit represented by the following general formula (2):

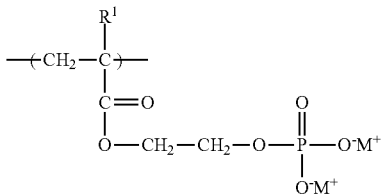

General formula (1)

wherein, in the general formula (1), $R^1$ represents either of a hydrogen atom and a methyl group; $M^+$ represents any of an alkali metal ion, an organic amine ion and a hydrogen ion; and one-half or more of the $M^+$ in the copolymer is any of an alkali metal ion and an organic amine, and the remainder is a hydrogen ion;

General formula (2)

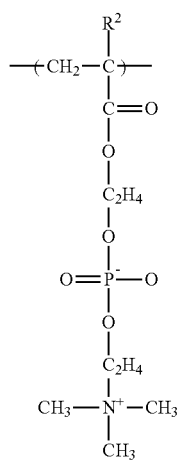

wherein, in the general formula (2), R² represents either of a hydrogen atom and a methyl group.

According to the present invention, it is possible to provide an inkjet recording ink, capable of solving the various conventional problems, capable of achieving the foregoing object, capable of obtaining a high image density on plain paper, and satisfactory in the storage stability and the ejection stability of the ink.

Figure 1:
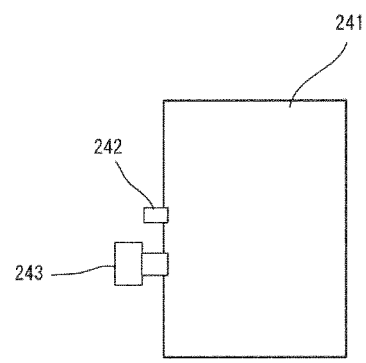
FIG. 1 is a schematic view illustrating an example of an ink cartridge.

DETAILED DESCRIPTION OF THE INVENTION (Inkjet Recording Ink)

The inkjet recording ink of the present invention includes at least water, a water-soluble solvent, a pigment and a phosphate group-containing copolymer, and further includes, if necessary, other components.

The phosphate group-containing copolymer includes at least the structural unit represented by the following general formula (1) and the structural unit represented by the following general formula (2), and additionally preferably includes the structural unit represented by at least either of the following general formula (3) and the following general formula (4), and further, if necessary, other structural units.

General formula (1)

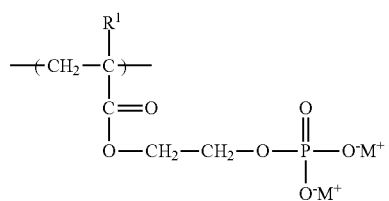

wherein, in the general formula (1), R¹ represents any of a hydrogen atom and a methyl group; M⁺ represents any of an alkali metal ion, an organic amine ion and a hydrogen ion; and one-half or more of the M⁺ in the copolymer is any of an alkali metal ion and an organic amine, and the remainder is a hydrogen ion;

General formula (2)

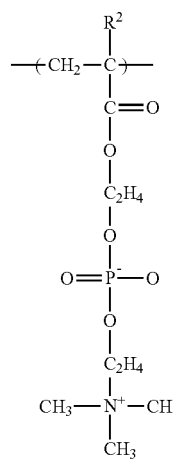

wherein, in the general formula (2), R² represents either of a hydrogen atom and a methyl group;

General formula (3)

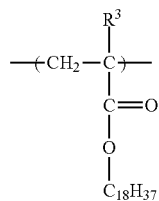

wherein, in the general formula (3), R³ represents either of a hydrogen atom and a methyl group;

General formula (4)

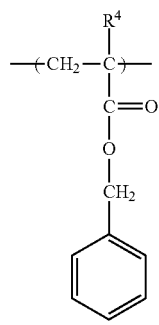

wherein, in the general formula (4), R⁴ represents either of a hydrogen atom and a methyl group.

The phosphate group contained in the structural unit represented by the general formula (1) exhibits hydrophilicity, but has a feature such that the phosphate group concerned exhibits hydrophobicity by bonding with a multivalent metal ion (in particular, calcium ion). Accordingly, when an image is formed on a recording medium containing a water-soluble multivalent metal salt, in the inkjet recording ink using the phosphate group-containing copolymer as a pigment dispersant, the multivalent metal ion eluted from the recording media into the ink hydrophobizes the phosphate group contained in the structural unit represented by the general formula (1), and the copolymer is aggregated involving the pigment to accumulate the pigment on the paper surface so as to improve the image density.

However, in the case of PPC plain paper in which the contained multivalent metal salt is generally sparingly water-soluble calcium carbonate, and the amount of the calcium ion eluted into the ink is small. Accordingly, just the inclusion of the structural unit represented by the general formula (1) does not make it possible to obtain a sufficient image density on plain paper.

As a method for solving the foregoing problem, a method is possible which increases the proportion of the structural unit represented by the general formula (1) in the phosphate group-containing copolymer. However, when the proportion of the structural unit represented by the general formula (1) is increased, probably because the interaction among the phosphate groups comes to be strong, the gelation of the phosphate group-containing copolymer occurs to disadvantageously cause the degradation of the storage stability of the ink. Accordingly, the constitutional proportion of the conventional phosphate group-containing copolymer has to be set at 20% by mass or less.

In the present invention, by combining the structural unit represented by the general formula (1), the structural unit represented by the general formula (2), and preferably the structural unit represented by at least either of the general formula (3) and the general formula (4), the affinity to the pigment is improved, the aggregation effect involving the pigment is improved, and additionally, even an ink having a large content of the water-soluble solvent is improved in storage stability. The gelation of the copolymer comes to hardly occur, the proportion of the structural unit represented by the general formula (1) can be made higher, and additionally, the reactivity with the multivalent metal ion (in particular, calcium ion) can be improved. The affinity to the pigment is particularly satisfactory in the structural unit represented by at least either of the general formula (3) and the general formula (4), the use of the foregoing structural unit in combination with the structural unit represented by the general formula (2) provides the improvement of the affinity to the pigment and the gelation suppression effect of the phosphate group-containing copolymer.

The inkjet recording ink of the present invention can obtain a high image density even on a common plain paper having a small content of a water soluble multivalent metal salt and can improve the storage stability and the ejection stability of the ink, by using the phosphate group-containing copolymer including the structural unit represented by the general formula (1) and the structural unit represented by the general formula (2), and additionally preferably the structural unit represented by at least either of the general formula (3) and the general formula (4).

<Phosphate Group-Containing Copolymer>

The phosphate group-containing copolymer includes at least the structural unit represented by the general formula (1) and the structural unit represented by the general formula (2), and additionally preferably includes the structural unit represented by at least either of the following general formula (3) and the following general formula (4), and further, if necessary, other structural units.

The phosphate group-containing copolymer has a property such that when the inkjet recording ink impacts on a recording medium such as plain paper, the copolymer interacts with the multivalent metal ion (in particular, calcium ion) contained in the plain paper to be aggregated. This function suppresses the penetration of the ink into the paper so as to allow a high image density to be obtained.

In the present invention, the phosphate group-containing copolymer can be used as a pigment dispersant or an additive; in particular, by using as the pigment dispersant the phosphate group-containing copolymer, it is possible to provide an ink satisfactory in high image density and storage stability.

In the general formula (1), $R^1$ represents either of a hydrogen atom and a methyl group.

Examples of the alkali metal in the alkali metal ion of $M^+$ in the general formula (1) include lithium, sodium and potassium.

Examples of the organic amine in the organic amine ion of the $M^+$ in the general formula (1) include: alkylamines such as mono-, di- or trimethylamine and mono-, di- or triethyl amine; alcohol amines such as ethanolamine, diethanolamine, triethanolamine, methyl ethanolamine, methyldiethanolamine, dimethylethanolamine, monopropanolamine, dipropanolamine, tripropanolamine, isopropanol amine, tris (hydroxymethyl)aminomethane and 2-amino-2-ethyl-1,3-propanediol (AEPD); cyclic amines such as corrin, morpholine, N-methylmorpholine, N-methyl-2-pyrrolidone and 2-pyrrolidone, and organic ammoniums such as tetramethylammonium, tetraethylammonium and tetrabutylammonium.

Among these, ethanolamine and dimethyl ethanolamine are preferable from the viewpoint of the storage stability and the ejection stability of the ink.

As the $M^+$, one-half or more of the $M^+$ is an alkali metal ion or an to organic amine, and the remainder is a hydrogen ion (proton) (the neutralization rate of the phosphate group-containing copolymer is preferably 50% or more); from the viewpoint of the image density, and the storage stability and the ejection stability, all of the $M^+$ (neutralization rate is 100%) is particularly preferably an alkali metal ion or an organic amine ion.

When the neutralization rate is less than 50%, the dispersion condition of the pigment comes to be unstable, and consequently the initial viscosity of the pigment dispersion sometimes comes to be high or the storage stability of the pigment dispersion is sometimes decreased.

The neutralization rate can be derived from the ratio of the addition amount of the neutralizing agent to the placed amount of the structural unit represented by the general formula (1) (the monomer represented by the following general formula (5)) at the time of the synthesis of the phosphate group-containing copolymer.

The phosphate group-containing copolymer can include the structural units derived from the monomers other than the structural unit represented by the general formula (1), the structural unit represented by the general formula (2), and the structural unit represented by at least either of the general formula (3) and the general formula (4).

The other monomers are not particularly limited and can be appropriately selected according to the intended purpose; examples of the other monomers include polymerizable hydrophobic monomers and polymerizable to hydrophilic monomers.

The polymerizable hydrophobic monomers are not particularly limited and can be appropriately selected according to the intended purpose. Examples of the polymerizable hydrophobic monomers include: unsaturated ethylene monomers having an aromatic ring such as styrene, α-methylstyrene, 4-t-butylstyrene and 4-chloromethylstyrene; alkyl (meth)acrylates such as methyl (meth)acrylate, ethyl (meth) acrylate, n-butyl (meth)acrylate, dimethyl maleate, dimethyl itaonate, dimethyl fumarate, lauryl (meth)acrylate (C12), tridecyl (meth)acrylate (C13), tetradecyl (meth)acrylate (C14), pentadecyl (meth)acrylate (C15), hexadecyl (meth) acrylate (C16), heptadecyl (meth)acrylate (C17), nanodecyl (meth)acrylate (C19), eicosyl (meth)acrylate (C20), heneicosyl (meth)acrylate (C21) and dococyl (meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nanodecene, 1-eicocene and 1-dococene. These may be used each alone or in combinations of two or more thereof.

The polymerizable hydrophilic monomers are not particularly limited and can be appropriately selected according to the intended purpose. Examples of the polymerizable hydrophilic monomers include: anionic unsaturated ethylene monomers such as (meth)acrylic acid or salts thereof maleic acid or salts thereof monomethyl maleate, itaconic acid, monomethyl itaconate, fumaric acid, 4-styrenesulfonic acid and 2-acrylamido-2-methylpropanesulfonic acid; and nonionic unsaturated ethylene monomers such as 2-hydroxyethyl (meth)acrylate, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinylformaide, N-vinylacetamide, N-vinylpyrrolidone, acrylamide, N,N-dimethylacrylamide, N-t-butylacrylamide, N-octylacrylamide and N-t-octylacsylamide. These may be used each alone or in combinations of two or more thereof.

The content of the constitutional unit represented by the general formula (1) in the phosphate group-containing copolymer is not particularly limited, and can be appropriately selected according to the intended purpose, but is preferably 10% by mass to 60% by mass and more preferably 15% by mass to 50% by mass in relation to the total mass of the copolymer. When the content is less than 10% by mass, the image density is sometimes decreased; when the content exceeds 60% by mass, the storage stability of the pigment dispersion and the storage stability of the ink are sometimes decreased.

The phosphate group-containing copolymer can be synthesized by polymerizing the monomer represented by the following general formula (5) and the monomer represented by the following general formula (6). Additionally, the phosphate group-containing copolymer is preferably synthesized by polymerizing the monomer represented by at least either of the following general formula (7) and the following general formula (8), and additionally can be synthesized by polymerizing, if necessary, other monomers. Subsequently, the obtained copolymer is subjected to neutralization treatment with either of an alkali metal base and an organic amine base:

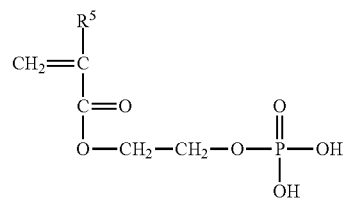

General formula (5)

wherein, in the general formula (5), $R^5$ represents either of a hydrogen atom and a methyl group;

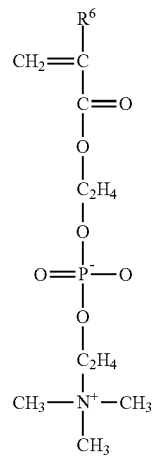

General formula (6)

wherein, in the general formula (6), $R^6$ represents either of a hydrogen atom and a methyl group;

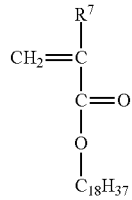

General formula (7)

wherein, in the general formula (7), $R^7$ represents either of a hydrogen atom and a methyl group;

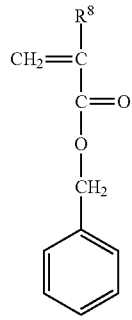

General formula (8)

wherein, in the general formula (8), $R^8$ represents either of a hydrogen atom and a methyl group.

Examples of the monomer represented by the general formula (5) include 2-methacryloyloxyethyl acid phosphate and 2-acryloyloxyethyl acid phosphate.

As foregoing 2-methacryloyloxyethyl acid phosphate, an appropriately synthesized compound may be used, or a commercial product may also be used. The commercial products come onto the market and are available, for example, under the product names of Light Ester P-1M manufactured by Kyoeisha Chemical Co., Ltd. and Phosmer M manufactured by Uni-Chemical Co., Ltd.

As foregoing 2-acryloyloxyethyl acid phosphate, an appropriately synthesized compound may be used, or a commercial product may also be used. The commercial product comes onto the market and is available, for example, under the product name of Light Acrylate P-1A manufactured by Kyoeisha Chemical Co., Ltd.

Examples of the monomer represented by the general formula (6) include 2-methacryloyloxyethyl phospholylcholine and 2-acryloyloxyethyl phospholylcholine.

As 2-methacryloyloxyethyl phospholylcholine, an appropriately synthesized product can be used.

As 2-acryloyloxyethyl phospholylcholine, an appropriately synthesized product can be used.

Examples of the monomer represented by the general formula (7) include stearyl methacrylate and stearyl acrylate.

Examples of the monomer represented by the general formula (8) include benzyl methacrylate and benzyl acrylate.

The polymerization method of the phosphate group-containing copolymer used in the present invention is not particularly limited, and as the polymerization method, heretofore known various synthesis methods such as solution polymerization, suspension polymerization, bulk polymerization and emulsion polymerization can be utilized; however, from the viewpoint of easiness in polymerization operation and molecular weight regulation, a method using a radical polymerization initiator is preferable.

The radical polymerization initiator is not particularly limited, and generally used radical polymerization initiators can be used; specific examples of such an initiator include peroxy ketal, hydropemroxide, dialkyl pemroxide, diacyl peroxide, peroxydicarbonate, peroxy ester, cyano-based azobisisobutyronitrile, azobis(2-methyl butyronitrile), azobis(2,2'-isovaleronitrile) and non-cyano-based dimethyl-2,2'-azobisisobutyrate.

Among these, organic peroxides and am compounds easy in molecular weight control and low in decomposition temperature are preferable, and am compounds are particularly preferable.

The used amount of the polymerization initiator is not particularly limited and can be appropriately selected according to the intended purpose, but is preferably 1% by mass to 10% by mass in relation to the total mass of the polymerizable monomers.

For the purpose of regulating the molecular weight of the phosphate group-containing copolymer, a chain transfer agent such as mercaptoacetic acid, mercaptopropionic acid, 2-propanethiol, 2-mercaptoethanol, thiophenol, dodecyl mercaptan, 1-dodecanethiol or thioglycerol may be added in an appropriate amount to the polymerization system.

The polymerization temperature is not particularly limited and can be appropriately selected according to the intended purpose, but is preferably 50° C. to 150° C. The polymerization time is not particularly limited and can be appropriately selected according to the intended purpose, but is preferably 3 hours to 48 hours.

The phosphate group-containing copolymer is synthesized from the monomer represented by the general formula (5) and the monomer represented by the general formula (6) as starting materials. Moreover, the phosphate group-containing copolymer is preferably synthesized by using as the starting material the monomer represented by at least either of the general formula (7) and the general formula (8). Other monomer components may be added to the phosphate group-containing copolymer.

The phosphate group-containing copolymer can be polymerized, for example, at normal temperature to 150° C. by placing a solvent, the monomer represented by the general formula (5) and the monomer represented by the general formula (6), additionally preferably the monomer represented by at least either of the general formula (7) and the general formula (8), and by adding, if necessary, a polymerization initiator and a chain transfer agent, in a four-neck flask equipped with a thermometer, a stirrer and a nitrogen introduction tube.

The phosphate groups in the phosphate group-containing copolymer are partially or wholly subjected to neutralization treatment with a base. The neutralization treatment can also be performed under the condition such that the pigment and the copolymer are mixed with each other in the production of the ink.

As the base used in the neutralization treatment, for example, an alkali metal and an organic amine are quoted, and specific examples of the base are as described above.

The viscosity of a 10% by mass aqueous solution of the phosphate group-containing copolymer is not particularly limited, and can be appropriately selected according to the intended purpose, but is at 25° C. preferably 2.5 mPa·s to 35.0 mPa·s and more preferably 4.0 mPa·s to 30.0 mPa·s. When the viscosity is less than 2.5 mPa·s, the reactivity between the metal ion eluted from a recording medium such as plain paper and the pigment dispersant is degraded and the image density is sometimes decreased somewhat; when the viscosity exceeds 35.0 mPa·s, the dispersion stability of the pigment is degraded and the storage stability of the pigment dispersion is sometimes degraded somewhat.

The viscosity can be measured, for example, with a rotation viscometer (TV-22 viscometer, cone-plate type, manufactured by Toki Sangyo Co., Ltd.).

The phosphate group-containing copolymer can be widely used in various fields, without being particularly limited, and can be suitably used as additives such as a chelating agent, a pigment concentration improving agent, a pigment binder resin and a viscosity regulator, and as a pigment dispersant.

The content of the phosphate group-containing copolymer in the inkjet recording ink when the phosphate group-containing copolymer is used as an additive is not particularly limited and can be appropriately selected according to the intended purpose, but is preferably 0.5% by mass to 10% by mass and more preferably 1% by mass to 5% by mass. The addition of the phosphate group-containing copolymer in a content of 0.5% by mass or more results in a definite improvement effect of the image density, and the addition of the phosphate group-containing copolymer in a content of 10% by mass or less allows the viscosity of the ink to be suppressed so as to fall in a viscosity range suitable for the ejection of the ink from the head.

When the phosphate group-containing copolymer is used as a pigment dispersant, the image density on plain paper can be improved. Additionally, the storage stability of a rich ink having a content of the water-soluble solvent exceeding 20% by mass is found to be further improved.

The content of the phosphate group-containing copolymer used as a pigment dispersant in the inkjet recording ink is not particularly limited, and can be appropriately selected according to the intended purpose, but is preferably 1 part by mass to 100 parts by mass and more preferably 5 parts by mass to 80 parts by mass in relation to 100 parts by mass of the pigment. Within this range, the most suitable particle size of the pigment is obtained, and the image density, the dispersibility and the storage stability fall within satisfactory ranges, respectively. Alternatively, within a range not impairing the advantageous effects, a below-described dispersant may also be used in combination with the copolymer.

<Water>

The water is not particularly limited, and can be appropriately selected according to the intended purpose, and examples of the water include pure water and ultrapure water such as ion-exchanged water, ultrafiltered water, reverse osmotic water and distilled water.

The content of the water in the inkjet recording ink is not particularly limited, and can be appropriately selected according to the intended purpose, but is preferably 20% by mass to 60% by mass.

<Water-Soluble Solvent>

The water-soluble solvent has, for example, a function to improve the ejection stability by imparting moisture retaining effect.

The water-soluble solvent is not particularly limited, and can be appropriately selected according to the intended purpose. Examples of the water-soluble solvent include: polyhydric alcohols such as ethylene glycol, diethylene glycol, 1,3-butanediol, 3-methyl-1,3-butyl glycol triethylene glycol, polyethylene glycol, polypropylene glycol 1,5-pentanediol, 1,6-hexanediol, glycerin, 1,2,6-hexanetriol, 2-ethyl-1,3-hexanediol, 2,2,4-trimethyl-1,3-pentanediol, 1,2,4-butanetriol, 1,2,3-butanetriol, petriol and trimethylolpropane; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, 1 tetraethylene glycol monomethyl ether and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolidinone, ϵ-caprolactam and γ-butyrolactone; amides such as formamide, N-methylfromamide and N,N-dimethyl fromamide; amines such as monoethanolamine, diethanolamine and triethylamine; sulfur-containing compounds such as dimethyl sulfoxide, sulfolane and thiodiethanol; and propylene carbonate and ethylene carbonate.

These may be used each alone or in combinations of two or more thereof. Among these, from the viewpoint of preventing the ejection failure due to evaporation of moisture, 1,3-butanediol, 2-pyrrolidone, glycerin and trimethylolpropane are preferable.

The content of the water-soluble solvent in the inkjet recording ink is not particularly limited and can be appropriately selected according to the intended purpose, but is preferably 10% by mass to 50% by mass. When the content is less than 10% by mass, the ink tends to undergo moisture evaporation, and for example, the moisture evaporation of the ink sometimes causes ink clogging due to thickening of the ink in the ink feeding system in the inkjet recording apparatus. When the content exceeds 50% by mass, the ink clogging due to thickening of the ink is made to hardly occur in the inkjet recording apparatus, however, it is sometimes necessary to reduce the solid content such as a pigment or a resin in order to make the ink have an intended viscosity, and thus the image density of the ink recorded matter is sometimes reduce.

<Pigment>

The pigment is not particularly limited and can be appropriately selected according to the intended purpose, and may be, for example, either of an inorganic pigment or an organic pigment. These may be used each alone or in combinations of two or more thereof.

Examples of the inorganic pigment include titanium oxide, iron oxide, calcium carbonate, barium sulfate, aluminum hydroxide, barium yellow, Prussian blue, cadmium red, chromium yellow, metal powders and carbon black. Among these, carbon black is preferable. Examples of the carbon black include carbon blacks produced by the heretofore known methods such as a contact method, a furnace method and a thermal method.

Examples of the organic pigment include am pigments, azomethine pigments, polycyclic pigments, dye chelates, nitro pigments, nitroso pigments and aniline black. Among these, for example, azo pigments and polycyclic pigments are preferable.

Examples of the azo pigments include azo lakes, insoluble am pigments, condensed am pigments and chelate am pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, quinophthalone pigments and rhodamine B lake pigments Examples of the dye chelates include basic dye chelates and acidic dye chelates.

Examples of the pigments for black color include: carbon black (C.I. Pigment Black 7) such as furnace black, lamp black, acetylene black or channel black carbon black; metals such as copper, iron (C.I. Pigment Black 11) and titanium oxide; and organic pigments such as aniline black (C.I. Pigment Black 1).

As the carbon black, preferable is a carbon black which is produced by the furnace method or the channel method, has a primary particle size of 15 nm to 40 nm, has a specific surface area based on the BET method of 50 $m^2/g$ to 300 $m^2/g$, has a DBP oil absorption amount of 40 mL/100 g to 150 mL/100 g, has a volatile component content of 0.5% to 10%, and has a pH of 2 to 9.

As the carbon black, a commercial product can be used. Examples of the commercial product include: No. 2300, No. 900, MCF-88, No. 33, No. 40, No. 45, No. 52, MA7, MA8, MA100, No. 2200B (these are all manufactured by Mitsubishi Chemical Corp.); Raven 700, Raven 5750, Raven 5250, Raven 5000, Raven 3500, Raven 1255 (these are all manufactured by Columbian Chemicals Co.); Regal 400R, Regal 330R, Regal 660R, Mogul L, Monarch 700, Monarch 800, Monarch 880, Monarch 900, Monarch 1000, Monarch 1100, Monarch 1300, Monarch 1400 (these are all manufactured by Cabot Corp); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 and NIPEX160 (these are all manufactured by Evonik Degussa GmbH).

The pigments usable for yellow inks of the foregoing pigments for color are not particularly limited, and can be appropriately selected according to the intended purpose. Examples of such pigments include: C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174 and C.I. Pigment Yellow 180.

The pigments usable for magenta inks of the foregoing pigments for color are not particularly limited, and can be appropriately selected according to the intended purpose. Examples of such pigments include: C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112. C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202 and C.I. Pigment Violet 19.

The pigments usable for cyan inks of the foregoing pigments for color are not particularly limited, and can be appropriately selected according to the intended purpose. Examples of such pigments include: C.I. Pigment Blue 1, C.I. Pigment Blue 2, CJ. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Vat Blue 4 and C.I. Vat Blue 60.

As the pigments contained in the individual inks used in the present invention, even the pigments newly produced for the present invention can also be used.

The use of C.I. Pigment Yellow 74 as a yellow pigment, C.I. Pigment Red 122 and C.I. Pigment Violet 19 as magenta pigments and C.I. Pigment Blue 15:3 as a cyan pigment allows an ink excellent in color tone and lightfastness and satisfactory in balance to be obtained.

As the pigments used in the present invention, pigments subjected to a graft treatment or a capsulation treatment by coating the pigments with a surfactant such as a dispersant or a resin can also be used; however, the compound of the present invention is more preferably used as a dispersant.

Within a range not impairing the advantageous effects, the foregoing pigments may also be used in combinations.

The volume average particle size of the pigment is not particularly limited, and can be appropriately selected according to the intended purpose, but is preferably 150 nm or less.

The volume average particle size of the pigment can be measured by the dynamic light scattering method with the Microtrac UPA manufactured by Nikkiso Co., Ltd. in an environment of 23° C. and 55% RH.

The content of the pigment in the inkjet recording ink is not particularly limited and can be appropriately selected according to the intended purpose, but is preferably 0.1% by mass to 20% by mass.

As the pigment, a pigment dispersion is preferably used.

The pigment dispersion is obtained by mixing water, a pigment and a pigment dispersant, and if necessary, other components, and by subsequently dispersing the resulting mixture with a disperser to regulate the particle size.

As the pigment dispersant, the phosphate group-containing copolymer of the present invention is preferably used; however, examples of other usable dispersants include: various surfactants such as anionic surfactants, cationic surfactants, amphoteric surfactants, nonionic surfactants sodium naphthalenesulfonate formalin condensate, and polymer-type dispersants. These may be used each alone or in combinations of two or more thereof.

Examples of the anionic surfactants include: alkylsulfocarboxylic acid salt, α-olefin sulfonic acid salt, polyoxyethylene alkyl ether acetic acid salt. N-acylamino acids and the salts thereof: N-acylmethyl tauric acid salt, polyoxyalkyl ether sulfuric acid salt, polyoxyethylene alkyl ether phosphoric acid salt, rosin acid soap, castor-oil sulfuric acid ester salt, lauryl alcohol sulfuric acid ester salt, alkylphenol type phosphoric acid ester, naphthalenesulfonic acid salt formalin condensate, alkyl type phosphoric acid ester, alkyl allyl sulfonic acid salt, diethylsulfosuccinic acid salt, diethylhexylsulfsuccnic acid salt and dioctylsulfsuccinicic acid salt.

Examples of the cationic surfactants include 2-vinylpyridine derivatives and poly-4-vinylpyridine derivatives.

Examples of the amphoteric surfactants include lauryidimethylaminoaetic acid betaine, 2-alkyl-N-carboxymethyl-N-hydroxyethylimidazolinium betaine, palm oil fatty acid propyldimethylaminoeoetic acid betaine, polyoctylpolyamincethylglycine and imidazoline derivatives.

Examples of the nonionic surfactants include: ether-based surfactants such as polyoxyethylene nonyl phenyl ether, polyoxyethylene octyl phenyl ether, polyoxyethylene dodecyl phenyl ether, polyoxyethylene lauryl ether, polyoxyethylene oleyl ether, polyoxyethylene alkyl ether and polyoxy aralkyl alkyl ether; ester-based surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate and polyoxyethylene stearate; and acetylene glycol-based surfactants such as 2,4,7,9-tetramethyl-5-decyne-4,7-diol, 3,6-dimethyl-4-octyl-3,6-diol and 3,5-dimethyl-1-hexyne-3-ol.

The content of the pigment at the time of the preparation of the pigment dispersion is not particularly limited, and can be appropriately selected according to the intended purpose, but is preferably 0.1% by mass to 50% by mass and more preferably 0.1% by mass to 30% by mass.

The obtained pigment dispersion is preferably, if necessary, subjected to filtration of coarse particles with, for example, a filter or a centrifugal separator, and subjected to deaeration.

<Other Components>

The other components are not particularly limited, and can be appropriately selected according to the intended purpose; however, examples of the other components include a penetrating agent, a pH adjuster, a water-dispersible resin, a preservative and fungicide, a chelating agent, an anti-rust agent, an antioxidant, an ultraviolet absorber, an oxygen absorber and a light stabilizer.

—Penetrating Agent—

The penetrating agent preferably includes either of a polyol compound having 8 to 11 carbon atoms and a glycol ether compound having 8 to 11 carbon atoms.

The penetrating agent is different from the wetting agent, and relatively lower in wettability than the wetting agent, and hence can be referred to as a "non-wetting agent type medium." The non-wetting agent-type penetrating agent preferably has a solubility of 0.2% by mass to 5.0% by mass in water at 25° C.

Among these, 2-ethyl-1,3-hexanediol [solubility: 4.2% by mass (25° C.)] and 2,2,4-trimethyl-1,3-pentane diol [solubility: 2.0% by mass (25° C.)] are particularly preferable.

Examples of the other polyol compounds include: aliphatic diols such as 2-ethyl-2-methyl-3-propanediol, 3,3-dimethyl-1,2-butanediol, 2,2-diethyl-1,3-propanediol 2-methyl-2-propyl-1,3-propanediol, 2,4-dimethyl-2,4-pentane diol, 2,5-dimethyl-2,5-hexane diol and 5-hexane-1,2-diol.

The other penetrating agents usable in combination are not particularly limited and can be appropriately selected according to the intended purpose as long as the other penetrating agents are soluble in ink and allow the properties of the ink to be regulated to meet the intended properties; examples of the other penetrating agents include: alkyl and aryl ethers of polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether and tetraethylene glycol chlorophenyl ether; and lower alcohols such as ethanols.

The content of the penetrating agent in the inkjet recording ink is not particularly limited, and can be appropriately selected according to the intended purpose, but is preferably 0.1% by mass to 4% by mass. When the content is less than 0.1% by mass, no quick drying property is sometimes obtained to result in blurred images, and when the content exceeds 4% by mass, the dispersion stability of the pigment is sometimes impaired to cause the nozzle to tend to undergo clogging, the penetrability into the media for recording (recording media) sometimes comes to be higher than necessary, or the decrease of the image density or the strike through is sometimes caused to occur.

—pH Adjuster—

The pH adjuster is not particularly limited and can be appropriately selected according to the intended purpose as long as the pH adjuster can adjust the pH of the inkjet recording ink so as to fall within a range from 8.5 to 11 and preferably from 9 to 11 without adversely affecting the inkjet recording ink to be prepared; however, examples of the pH adjuster include alcoholamines, hydroxides of alkali metal elements, hydroxides of ammonium, phosphonium hydroxides and carbonates of alkali metals. When the pH is less than 8.5 and exceeds 11, the dissolution amount of the inkjet head or the ink feeding unit sometimes comes to be large to cause failures such as the quality change or leakage of the ink, or the ejection failure. When the pH is less than 85, the pH of the ink is sometimes decreased during the storage of the ink to cause the to aggregation of the polymer fine particles due to the increase of the particle size.

The pH can be measured, for example, with a pH meter (HM-30R, manufactured by DKK-TOA Corp.).

Examples of the alcoholamines include diethanolamine, triethanolamine and 2-amino-2-ethyl-1,3-propanediol Examples of the hydroxides of alkali metal elements include lithium hydroxide, sodium hydroxide and potassium hydroxide. Examples of the hydroxides of ammonium include ammonium hydroxide, quaternary ammonium hydroxide and quaternary phosphonium hydroxide. Examples of the carbonates of alkali metals include lithium carbonate, sodium carbonate and potassium carbonate.

—Water-Dispersible Resin—

The water-dispersible resin is excellent in film formability (image formability), is provided with high water repellency, high water resistance and high weather resistance, and is useful for recording of images having high water resistance and high image density (high color developing property).

Specific examples of the water-dispersible resin include condensed synthetic resins, addition synthetic resins and natural polymer compounds.

Examples of the condensed synthetic resins include polyester resins, polyurethane resins, polyepoxy resins, polyamide resins, polyether resins, poly(meth)acrylic resin, acrylic-silicone resins and fluorine-based resins. Examples of the addition synthetic resins include polyolefin resins, polystyrene-based resins, polyvinyl alcohol-based resins, polyvinyl ester-based resins, to polyacrylic acid-based resins and unsaturated carboxylic acid-based resins. Examples of the natural polymer compounds include celluloses, rosins and natural rubbers.

Among these, polyurethane resin fine particles, acrylic-silicone resin fine particles and fluorine-based resins fine particles are preferable.

The volume average particle size of the water-dispersible resin is related with the viscosity of the dispersion, and in the case of the dispersions having the same compositions, the smaller the particle size, the higher the viscosity for the same solid content. In order to prevent the ink from being excessively high in viscosity, the volume average particle size of the water dispersible resin is preferably 50 nm or more. If the particle size comes to be a few tens microns, such size is larger than the nozzle opening of the inkjet head, and hence it is impossible to use the water-dispersible resin having such a particle size. Even if the particle size is smaller than the nozzle opening, the presence of the particles having larger particle sizes degrades the ejection stability of the ink. Accordingly, in order not to inhibit the ink ejection stability, the volume average particle size is more preferably 200 nm or less.

Here, the volume average particle size of the water-dispersible resin is the value measured by the dynamic light scattering method with the Micnotrac UPA manufactured by Nikkiso Co., Ltd. in an environment of 23° C. and 55% RH.

The water-dispersible resin preferably has a function to fix the water dispersed pigment on the paper surface and to allow the water dispersed pigment to form a coating film at normal temperature so as to improve the fixability of the pigment. For that purpose, the minimum film formation temperature (MFT) of the water-dispersible resin is preferably 30° C. or lower.

When the glass transition temperature of the water-dispersible resin is −40° C. or lower, the viscosity of the resin coating film comes to be strong to cause tack on printed materials, and hence the water-dispersible resin is preferably a water-dispersible resin having a glass transition temperature of −30° C. or higher.

The content of the water-dispersible resin in the inkjet recording ink is not particularly limited, and can be appropriately selected according to the intended purpose, but is preferably 1% by mass to 15% by mass and more preferably 2% by mass to 7% by mass.

—Preservative and Fungicide—

Examples of the preservative and fungicide include sodium dehydroacetate, sodium sorbate, sodium 2-pyridinethiol-1-oxide, sodium benzoate and sodium pentachlorophenolate.

—Chelating Agent—

Examples of the chelating agent include sodium ethylenediaminetetraacetate, sodium nitrilotriacetate, sodium hydroxyethyl ethylenediaminetriacetate, sodium diethylenetriaminepentaacetate and sodium uramildiacetate.

—Anti-Rust Agent—

Examples of the anti-rust agent include acid sulfite, sodium thiosulfate, ammonium thiodiglycolate, diisopropylammonium nitrite, pentaerythritol tetranitrate and dicyclohexylammonium nitrite.

—Antioxidant—

Examples of the antioxidant include phenolic antioxidants (inclusive of hindered phenolic antioxidants), amine-based antioxidants, sulfur-based antioxidants and phosphorus-based antioxidants.

—Ultraviolet Absorber—

Examples of the ultraviolet absorber include benzophenone-based ultraviolet absorbers, benaotriazole-based ultraviolet absorbers, salicylate-based ultraviolet absorbers, cyanoacrylate-based ultraviolet absorbers and nickel complex-based ultraviolet absorbers.

<Method for Producing Inkjet Recording Ink>

The inkjet recording ink can be produced by dispersing or dissolving water, a water-soluble solvent, a pigment and a phosphate group-containing copolymer, and if necessary, other components in an aqueous medium, and if necessary, by stirring and mixing the resulting mixture.

The dispersion operation can be performed with, for example, a sand mill, a homogenizer, a ball mill, a paint shaker or an ultrasonic disperser, and the stirring and mixing can be performed with a common stirrer using a stirring blade, a magnetic stirrer or a high speed disperser.

The viscosity of the inkjet recording ink of the present invention at 25° C. is not particularly limited, and can be appropriately selected according to the intended purpose, but is preferably 3 mPa·s to 20 mPa·s. The viscosity at 3 mPa·s or more results in the effects to improve the printing density or the letter quality. On the other hand, the viscosity suppressed at 20 mPa·s or less allows the ejection performance to be ensured.

The viscosity can be measured by using, for example, a viscometer (RL-550, manufactured by Toki Sangyo Co., Ltd.) at 25° C.

The surface tension of the inkjet recording ink is not particularly limited, and can be appropriately selected according to the intended purpose, but is 40 mN/m or less at 25° C. When the surface tension exceeds 40 mN/m, the leveling of the ink on the medium for recording sometimes hardly occurs to elongate the drying time.

(Ink Cartridge)

The ink cartridge of the present invention is a cartridge for housing in a vessel the inkjet recording ink of the present invention, and includes other members, if necessary, appropriately selected.

The vessel is not particularly limited with respect to the shape, structure, size and material quality, and can be appropriately selected according to the intended purpose; suitable examples of the vessel include a vessel having an ink bag formed with an aluminum laminate film or a resin film.

Figure 2:
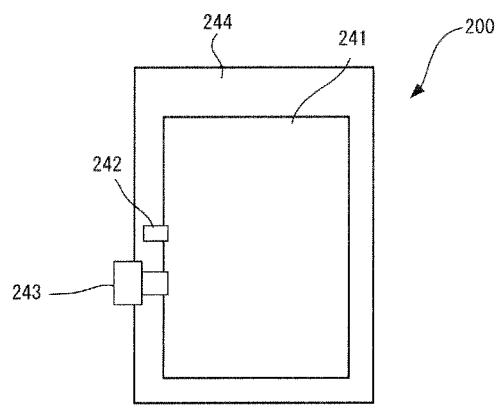
FIG. 2 is a schematic view illustrating the ink cartridge of FIG. 1 inclusive of the case thereof.

An aspect of the ink cartridge of the present invention is described with reference to FIG. 1 and FIG. 2. FIG. 1 is a schematic plan view illustrating an to example of the ink cartridge of the present invention. FIG. 2 is a schematic plan view of the ink cartridge of FIG. 1 inclusive of the case (exterior member) thereof.

As shown in FIG. 1, in the ink cartridge 200, ink is filled from an ink inlet 242 into an ink bag 241 and evacuated, and then the ink inlet 242 is fused to be closed. At the time of use, an ink outlet 243 made of a rubber member is pierced with a needle of the apparatus body to allow the ink to be fed to the apparatus. The ink bag 241 is formed of a packaging member such as an aluminum laminate film having no air permeability. As shown in FIG. 2, the ink bag 241 is usually housed in a cartridge case 244 made of a plastic, and is designed to be used as mounted in various inkjet recording apparatuses in a detachable manner.

(Ink Jet Recording Apparatus and Ink Jet Recording Method)

The inkjet recording apparatus of the present invention includes at least an ink flying unit, and additionally, if necessary, appropriately selected other units such as a stimulus generating unit and a control unit.

The inkjet recording method of the present invention includes at least an ink flying step, and additionally, if necessary, appropriately selected other steps such as a stimulus generating step and a control step.

The inkjet recording method of the present invention can be suitably implemented with the inkjet recording apparatus of the present invention, and the ink flying step can be suitably performed with the ink flying unit. The to other steps can be performed with the other units.

<Ink Flying Step and Ink Flying Unit>

The ink flying step is a step of forming an image by applying a stimulus to the inkjet recording ink of the present invention to allow the inkjet recording ink to fly.

The ink flying unit is a unit for forming an image by applying a stimulus to the inkjet recording ink of the present invention to allow the inkjet recording ink to fly. The ink flying unit is not particularly limited, and can be appropriately selected according to the intended purpose, and examples of such a unit include various nozzles for ink ejection.

The stimulus can be generated with, for example, the stimulus generating unit, and the stimulus is not particularly limited and can be appropriately selected according to the intended purpose; examples of such a stimulus include heat (temperature), pressure, vibration and light. These may be used each alone or in combinations of two or more thereof. Among these, heat and pressure are suitably quoted.

Examples of the stimulus generating unit include a heating device, a pressurizing device, a piezoelectric element, a vibration generator, an ultrasonic oscillator and a light source. Specific examples of the stimulus generating unit include: a piezoelectric actuator such as a piezoelectric element; a thermal actuator utilizing the phase change due to the film boiling of a liquid by using an electrothermal conversion element such as a heating resistor; a shape memory alloy actuator using the metal phase change due to temperature change; and an electrostatic actuator using electrostatic force.

The aspect of the ink flying is not particularly limited, and is varied depending on the factors such as the types of the foregoing stimuli; when the stimulus is "heat," examples of such an aspect include a method in which a is thermal energy corresponding to a recording signal is imparted to the ink in a recording head by using, for example, a thermal head, a bubble is generated in the ink by the thermal energy, and the ink is ejected and jetted as a droplet from the nozzle hole of the recording head. Alternatively, when the stimulus is "pressure," examples of such an aspect include a method in which a voltage is applied to a piezoelectric element made to adhere to a position denoted as a pressure chamber in the ink flow path in a recording head, thus the piezoelectric element is bent to reduce the volume of the pressure chamber, and consequently the ink is ejected and jetted as a droplet from the nozzle hole of the recording head.

The control unit is not particularly limited as long as the control unit can control the operations of the foregoing individual units, and can be appropriately selected according to the intended purpose; examples of such a control unit include devices such as a sequencer and a computer.

Herein, an aspect of implementing the inkjet recording method of the present invention with the inkjet recording apparatus of the present invention is described with reference to drawings.

Figure 3:
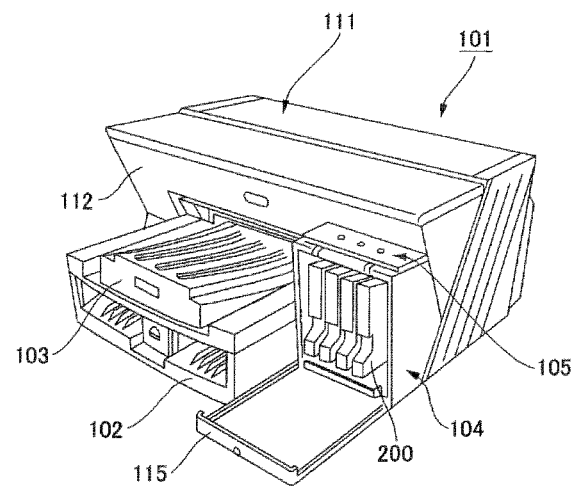
FIG. 3 is an oblique perspective view illustrating an example of an inkjet recording apparatus.

FIG. 3 is an oblique perspective view illustrating an example of the serial type inkjet recording apparatus of the present invention.

The inkjet recording apparatus shown in FIG. 3 includes an apparatus body 101, a paper feeding tray 102, mounted in the apparatus body 101 for loading sheets of paper, a paper discharge tray 103 mounted in the apparatus body 101 for stocking the sheets of paper having the images recorded (formed) thereon, and an ink cartridge mounting unit 104, on one end side of the front side 112 of the apparatus body 101, projecting forward from the front side 112 and being disposed to be lower than a frame top cover 111. On the top face of the ink cartridge mounting unit 104, an operation unit (panel) 105 including, for example, operation keys and indicators is disposed. The ink cartridge mounting unit 104 has a front cover 115, capable of being opened and closed, for attaching and detaching the ink cartridges 200.

Figure 4:
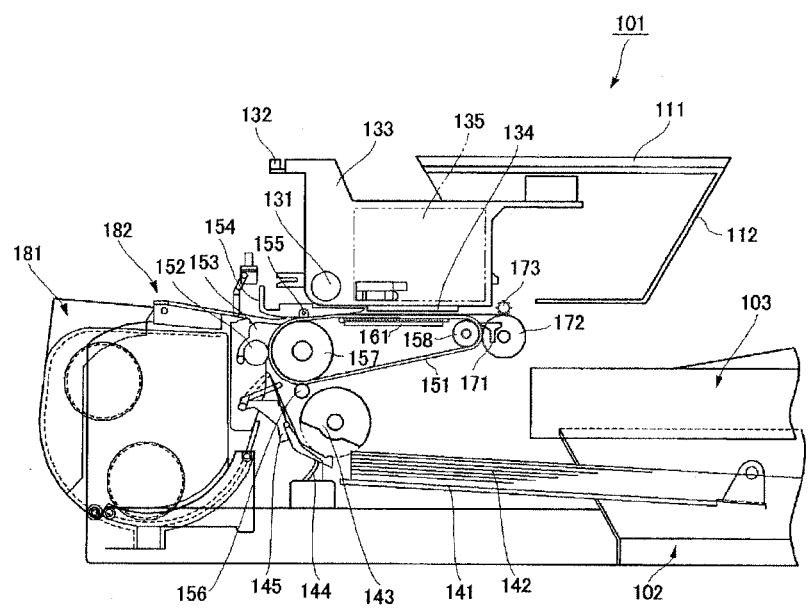
FIG. 4 is a view illustrating an example of an inkjet recording apparatus.
Figure 5:
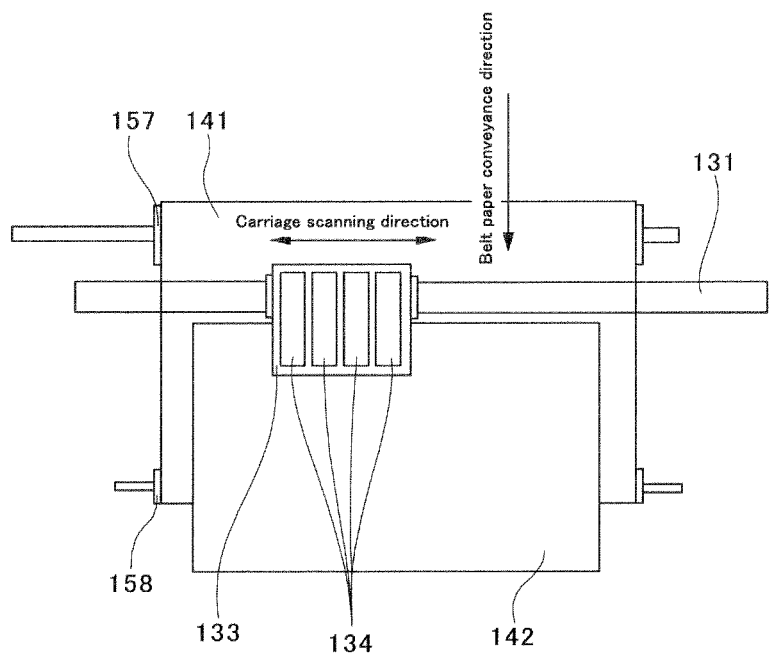
FIG. 5 is a schematic enlarged view illustrating an example of the inkjet head of an inkjet recording apparatus.

In the apparatus body 101, as shown in FIG. 4 and FIG. 5 (a partially enlarged cross-sectional view in the inkjet recording apparatus shown in FIG. 3), a carriage 133 is held freely slidably in the main-scanning direction by a guide rod 131 and a stay 132, which are the members laid across laterally between the right and left side plates omitted in the figure, and the carriage 133 is moved for scanning in the direction indicated by the arrows as shown in FIG. 5 by a main scanning motor.

In the carriage 133, recording heads 134, including four inkjet recording heads ejecting ink droplets of yellow (Y), cyan (C), magenta (M) and black (Bk) colors respectively, are arranged in such a way that a plurality of ink ejection openings lie in the direction crossing with the main-scanning direction, and the recording heads 134 are mounted in such a way that the ink droplet ejection direction lies in the downward direction.

As the inkjet recording heads constituting the recording heads 134, inkjet recording heads can be used which are provided with, as units generating energy to eject the ink, for example, a piezoelectric actuator such as a piezoelectric element, a thermal actuator utilizing the phase change due to the film boiling of a liquid by using an electrothermal conversion element such as a heating resistor; a shape memory alloy actuator using the metal phase change due to temperature change; or an electrostatic actuator using electrostatic force. In the carriage 133, subtanks 135 of individual colors for feeding individual color inks to the recording heads 134 are mounted. To the subtanks 135, the inks are fed and replenished through the intermediary of the not-shown ink feed tubes, from the ink cartridges 200 of the present invention mounted in the ink cartridge mounting unit 104.

On the other hand, as the paper feeding unit for paper feeding the sheets of paper 142 stacked in the sheets of paper stacking unit (pressure plate) 141 of the paper feeding tray 102, provided are a semicircular roller (paper feeding roller 143), for feeding one sheet by one sheet separately sheets of paper 142 from the sheets of paper stacking unit 141 and the separation pad 144 facing the paper feeding roller 143 and being made of a material having a large coefficient of friction, wherein the separation pad 144 is pressed against the paper feeding roller 143. As the conveying unit for conveying the sheets of paper 142 fed from the paper feeding unit, beneath the recording heads 134, provided are a conveyance belt 151 for electrostatically adsorbing and conveying the sheets of paper 142, the counter roller 152 for conveying the sheets of paper 142 conveyed from the paper feeding unit through the intermediary of a guide 145 by sandwiching the sheets of paper 142 between the counter roller 152 and the conveyance belt 151, a conveyance guide 153 for guiding the sheets of paper 142, conveyed substantially vertically, through a direction change of about 90°, on and along the conveyance belt 151, and a tip pressure roller 1655 pressed against the conveyance belt 151 with the aid of a pressing member 154.

A charging roller 156, the charging unit for charging the surface of the conveyance belt 151, is also provided. The conveyance belt 151 is an endless belt, and is laid across in a tensioned condition between a conveyance roller 157 and a tension roller 158 so as to be circumferentially movable in the belt conveyance direction. The conveyance belt 151 has, for example, a surface layer to be a paper sheet adsorbing surface, made of a resin material, not controlled in resistance, such as a copolymer between tetrafluoroethylene and ethylene (ETFE) of about 40 μm in thickness, and a back layer (medium resistance layer, ground layer) made of the same material as the material of the surface layer and controlled in resistance with carbon. On the back side of the conveyance belt 151, a guide member 161 is disposed so as to be parallel to the printing area based on the recording heads 134.

As the paper discharge unit for discharging the sheets of paper 142 recorded with the recording heads 134, provided are a separation claw 171 for separating the sheets of paper 142 from the conveyance belt 151, a paper discharge roller 172 and a paper discharge roller 173, wherein a paper discharge tray 103 is disposed beneath the paper discharge roller 172.

On the back side of the apparatus body 101, a double-side paper feeding unit 181 is mounted in a freely detachable manner.

The double-side paper feeding unit 181 takes in the sheets of paper 142 returned by the revere direction rotation of the conveyance belt 151, inverts the sheets of paper 142 and again feeds the sheets of paper 142 to between the counter roller 152 and the conveyance belt 151. On the top face of the double-side paper feeding unit 181, a manual paper feeding unit 182 is provided.

In the inkjet recording apparatus, the sheets of paper 142 are fed one sheet by one sheet separately from the paper feeding unit, and the sheets of paper 142 fed substantially vertically are guided by the guide 145, and conveyed in a manner sandwiched between the conveyance belt 151 and the counter roller 152. The tips of the sheets of paper 142 are guided by the conveyance guide 153 and are pressed against the conveyance belt 151 by the tip pressure roller 155, and the conveyance direction is changed by approximately 90°. In this case, the conveyance belt 151 is charged by the charging roller 156, and the sheets of paper 142 are conveyed in a manner electrostatically adsorbed onto the conveyance belt 151. In this case, by driving the recording heads 134 according to the image signal while the carriage 133 is being moved, ink droplets are ejected onto a standing sheet of paper 142 to record a line of printing, then the sheet of paper 142 is conveyed in a predetermined distance, and then the recording of the next line is performed.

When a recording termination signal or a signal indicating the arrival of the tail end of a sheet of paper 142 in the recording area signal is received, the recording operation is terminated and the sheet of paper 142 is discharged to the paper discharge tray 103. And, when the near end of the residual quantity of the ink in the subtank 135 is detected, the required amount of the ink is supplied from the ink cartridge 200 to the subtank 135.

In the inkjet recording apparatus, when the ink in the ink cartridge 201 of the present invention is used up, the enclosure in the ink cartridge 200 is disassemble and only the internal ink bag can be exchanged. Even a constitution in which the ink cartridge 200 is vertically disposed on the front side of the inkjet recording apparatus allows stable supply of the ink. Accordingly, even in a case where the inkjet recording apparatus is placed in such a way the top side of the apparatus body 101 is blocked, such as a case where the inkjet recording apparatus is placed in a rack, or a case where an object is placed on the top face of the apparatus body 101, the exchange of the ink cartridge 200 can be easily performed.

The foregoing description is based on an example in which the present to invention is applied to a serial type (shuttle type) inkjet recording apparatus allowing a carriage to scan; however, the present invention can also be applied to a line-type inkjet recording apparatus provided with a line-type head.

The inkjet recording apparatus of the present invention can be applied to various types of recording apparatuses based on the inkjet recording method, and for example, particularly suitably applied to inkjet recording printers, facsimile machines, copiers, and printer/fax/copier multi-function peripherals.

(Ink Recorded Matter)

The ink recorded matter of the present invention includes an image recorded with the inkjet recording ink of the present invention on a recording medium.

The recording medium is not particularly limited, and can be appropriately selected according to the intended purpose; however, examples of the recording medium include plain paper, coated printing paper, glossy paper, special paper, cloth, film and OHP sheet. These may be used each alone or in combinations of two or more thereof. Among these, at least either of plain paper and coated printing paper is preferable. The plain paper is advantageous because of being inexpensive. The coated printing paper is more advantageous as compared to glossy paper because of being relatively inexpensive and giving smooth glossy images. However, the plain paper and the coated printing paper are poor in drying property and generally find difficulty in use for ink-jet printing, but the inkjet recording ink of the present to invention is improved in drying property to allow the plain paper and the coated printing paper to be used.

The ink recorded matter of the present invention are high in image quality and free from blur and excellent in temporal stability, and can be suitably used for various purposes as various printed and image recording materials.

EXAMPLES

Hereinafter, Examples of the present invention are described, but the present invention is not limited to these Examples at all The following abbreviations mean the following compounds.

PMA: 2-Methacryloyloxyethyl acid phosphate (Phoemer M, manufactured by Uni-Chemical Co., Ltd.)

PA: 2-Acryloyloxyethyl acid phosphate (Light Acrylate P-1A, manufactured by Kyoeisha Chemical Co. Ltd.)

MPC: 2-Methacryloyloxyethyl phosphorylcholine (manufactured by NOF Corp.)

APC: 2-Acryloyloxyethyl phosphorylcholine (manufactured by NOF Corp.)

SMA: Stearyl methacrylate (Light Ester S, manufactured by Kyoeisha Chemical Co., Ltd.)

SA: Stearyl acrylate (Light Acrylate S-A, manufactured by Kyoeisha to Chemical Co., Ltd.)

BzMA: Benzyl methacrylate (Light Ester BZ, manufactured by Kyoeisha Chemical Co., Ltd)

AIBN: Ambisisobutyronitrile

The viscosity of the copolymer was measured by the following method. The neutralization rate of each of the copolymers was derived as follows.

<Measurement of Viscosity of Copolymer>

The measurement of the viscosity of a 10% by mass aqueous solution of each of the synthesized copolymers was performed with a rotation viscometer (TV-22 viscometer, cone-plate type, manufactured by Todki Sangyo Co., Ltd.). Specific operations are shown below. A copolymer was sampled in an amount of 1.1 mL and placed in a sample cup of the viecometer. At 25° C., the sample cup was mounted in the viscometer body and was allowed to stand still for 1 minute, and then the rotor of the viscometer was rotated, and the value after an elapsed time of 1 minute was read.

<Neutralization Rate of Copolymer>

The neutralization rate of each of the copolymers was derived from the ratio of the addition amount of the neutralizing agent to the placed amount of the phosphate group-containing monomer at the time of the synthesis of the copolymer.

Synthesis Example 1

—Synthesis of Copolymer 1—

In a four-neck flask, 12.0 g of PMA, 18.0 g of MPC, and 170.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 1. The viscosity of the aqueous solution of the obtained copolymer 1 was found to be 13.4 mPa·s at 25° C.

Synthesis Example 2

—Synthesis of Copolymer 2—

In a four-neck flask, 12.0 g of PMA, 180 g of MPC, and 170.0 g of ethanol were placed and stirred to prepare a uniform solution. After nitrogen was blown into the solution for 30 minutes, 2.0 g of AIBN was added to the solution at 65° C. and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 50%. The mixture was purified with a dialysis membrane for 3 days, and the concentration of the mixture was accurately regulated to be 10% by mass after the purification. The mixture thus obtained was adopted as the aqueous solution of the copolymer 2. The viscosity of the aqueous solution of the obtained copolymer 2 was found to be 9.3 mPa·s at 25° C.

Synthesis Example 3

—Synthesis of Copolymer 3—
In a four-neck flask, 12.00 g of PMA, 18.0 g of APC, and 170.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 3. The viscosity of the aqueous solution of the obtained copolymer 3 was found to be 14.3 mPa·s at 25° C.

Synthesis Example 4

—Synthesis of Copolymer 4—
In a four-neck flask, 12.00 g of PMA, 18.0 g of MPC, and 170.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with monoethanolamine (EA) so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 4. The viscosity of the aqueous solution of the obtained copolymer 4 was found to be 13.8 mPa·s at 25° C.

Synthesis Example 5

—Synthesis of Copolymer 5—
In a four-neck flask, 12.00 g of PA, 18.0 g of MPC, and 170.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 5. The viscosity of the aqueous solution of the obtained copolymer 5 was found to be 12.9 mPa·s at 25° C.

Synthesis Example 6

—Synthesis of Copolymer 6—
In a four-neck flask, 4.0 g of PMA, 16.0 g of MPC, and 380.0 g of ethanol were placed and stirred to prepare a uniform solution. After nitrogen was blown into the solution for 30 minutes, 4.0 g of AIBN was added to the solution at 65° C. and the solution was allowed to undergo polymerization reaction for 5 to hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 6. The viscosity of the aqueous solution of the obtained copolymer 6 was found to be 4.3 mPa·s at 25° C.

Synthesis Example 7

—Synthesis of Copolymer 7—
In a four-neck flask, 4.6 g of PMA, 41.4 of MPC, and 154.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 7. The viscosity of the aqueous solution of the obtained copolymer 7 was found to be 30.0 mPa·s at 25° C.

Synthesis Example 8

—Synthesis of Copolymer 8—
In a four-neck flask, 9.0 g of PMA, 6.0 g of MPC, and 285.0 g of ethanol were placed and stirred to prepare a uniform solution. After nitrogen was blown into the solution for 30 minutes, 3.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 8. The viscosity of the aqueous solution of the obtained copolymer 8 was found to be 4.0 mPa·s at 25° C.

Synthesis Example 9

—Synthesis of Copolymer 9—

In a four-neck flask, 27.6 g of PMA, 18.4 g of MPC, and 154.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 9. The viscosity of the aqueous solution of the obtained copolymer 9 was found to be 28.7 mPa·s at 25° C.

Synthesis Example 10

—Synthesis of Copolymer 10—

In a four-neck flask, 6.4 g of PMA, 25.6 g of MPC, and 768.0 g of ethanol were placed and stirred to prepare a uniform solution. After nitrogen was blown into the solution for 30 minutes, 8.&0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 10. The viscosity of the aqueous solution of the obtained copolymer 10 was found to be 3.1 mPa·s at 25° C.

Synthesis Example 11

—Synthesis of Copolymer 11—

In a four-neck flask, 5.0 g of PMA, 45.0 g of MPC, and 150.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after to the purification. The mixture thus obtained was adopted as the aqueous solution of the copolymer 11. The viscosity of the aqueous solution of the obtained copolymer 11 was found to be 33.5 mPa·s at 25° C.

Synthesis Example 12

—Synthesis of Copolymer 12—

In a four-neck flask, 7.2 g of PMA, 4.8 g of MPC, and 288.0 g of ethanol were placed and stirred to prepare a uniform solution. After nitrogen was blown into the solution for 30 minutes, 3.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 12. The viscosity of the aqueous solution of the obtained copolymer 12 was found to be 3.3 mPa·s at 25° C.

Synthesis Example 13

—Synthesis of Copolymer 13—

In a four-neck flask, 30.0 g of PMA, 20.0 g of MPC, and 150.0 g of to ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 13. The viscosity of the aqueous solution of the obtained copolymer 13 was found to be 34.1 mPa·s at 25° C.

Synthesis Example 14

—Synthesis of Copolymer 14—

In a four-neck flask, 1.6 g of PMA, 30.4 g of MPC, and 768.0 g of ethanol were placed and stirred to prepare a uniform solution. After nitrogen was blown into the solution for 30 minutes, 8.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane or 3 days, and the concentration of the mixture was accurately regulated to be 10% by mass after the purification. The mixture thus obtained was adopted as the aqueous solution of the copolymer 14. The viscosity of the aqueous solution of the obtained copolymer 14 was found to be 2.9 mPa·s at 25° C.

Synthesis Example 15

—Synthesis of Copolymer 15—

In a four-neck flask, 2.5 g of PMA, 47.5 g of MPC, and 150.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous to solution of the copolymer 15. The viscosity of the aqueous solution of the obtained copolymer 15 was found to be 32.7 mPa·s at 25° C.

Synthesis Example 16

—Synthesis of Copolymer 16—

In a four-neck flask, 9.6 g of PMA, 2.4 g of MPC, and 288.0 g of ethanol were placed and stirred to prepare a uniform solution. After nitrogen was blown into the solution for 30 minutes, 3.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 16. The viscosity of the aqueous solution of the obtained copolymer 16 was found to be 3.0 mPa·s at 25° C.

Synthesis Example 17

—Synthesis of Copolymer 17—

In a four-neck flask, 40.0 g of PMA, 10.0 g of MPC, and 150.0 g of ethanol were placed and stirred to prepare a uniform solution. After nitrogen to was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 17. The viscosity of the aqueous solution of the obtained copolymer 17 was found to be 33.3 mPa·s at 25° C.

Synthesis Example 18

—Synthesis of Copolymer 18—

In a four-neck flask, 12.00 g of PMA, 18.0 g of MPC, and 170.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the to resulting mixture was regulated to be 10% by mass, and the concentration-regulated mixture was neutralized with dimethylethanolamine (DMEA) so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer 18. The viscosity of the aqueous solution of the obtained copolymer 18 was found to be 14.1 mPa·s at 25° C.

Comparative Synthesis Example 1

—Synthesis of Comparative Copolymer 1—

In a four-neck flask, 100 g of maleic acid, 100 g of styrene, 500 g of water, and 15 g of ammonium persulfate were placed and stirred to prepare a uniform solution. After nitrogen was blown into the solution for 30 minutes, 2 g of AIBN was added to the solution at 80° C. to 90° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the comparative copolymer 1. The viscosity of the aqueous solution of the obtained comparative copolymer 1 was found to be 13.5 mPa·s at 25° C.

Comparative Synthesis Example 2

—Synthesis of Comparative Copolymer 2—

An aqueous solution of the comparative copolymer 2 was obtained in the same manner as in Synthesis of Comparative Copolymer 1 except that maleic acid and styrene in Comparative Synthesis Example 1 were replaced with PMA and styrene. The viscosity of the aqueous solution of the obtained comparative copolymer 2 was found to be 14.4 mPa·s at 25° C.

Comparative Synthesis Example 3

—Synthesis of Comparative Copolymer 3—

An aqueous solution of the comparative copolymer 3 was obtained in the same manner as in Synthesis of Comparative Copolymer 1 except that maleic acid and styrene in Comparative Synthesis Example 1 were replaced with maleic acid and MPC. The viscosity of the aqueous solution of the obtained comparative copolymer 3 was found to be 14.1 mPa·s at 25° C.

Comparative Synthesis Example 4

—Synthesis of Comparative Copolymer 4—

In a four-neck flask, 12.0 g of PMA, 18.0 g of MPC, and 170.0 g of ethanol were placed and stirred to prepare a uniform solution. After nitrogen was blown into the solution for 30 minutes, 2.0 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 40%. The mixture was purified with a dialysis membrane for 3 days, and the concentration of the mixture was accurately regulated to be 10% by mass after the purification. The mixture thus obtained was adopted as the aqueous solution of the comparative copolymer 4. The viscosity of the aqueous solution of the obtained comparative copolymer 4 was found to be 7.8 mPa·s at 25° C.

The copolymers of Synthesis Examples 1 to 18 and Comparative Synthesis Examples 1 to 4 are collectively listed in Table 1 and Table 2.

TABLE 1

| | | Structural unit represented by general formula (1) | | | Structural unit represented by general formula (2) | | | Viscosity of |
|---|---|---|---|---|---|---|---|---|
| | Copolymer | Monomer | Proportion (% by mass) | Neutralizing salt | Monomer | Proportion (% by mass) | Neutralization rate (%) | 10% by mass aqueous solution (mPa · s) |
| Synthesis Example 1 | Copolymer 1 | PMA | 40 | NaOH | MPC | 60 | 100 | 13.4 |
| Synthesis Example 2 | Copolymer 2 | PMA | 40 | NaOH | MPC | 60 | 60 | 9.3 |
| Synthesis Example 3 | Copolymer 3 | PMA | 40 | NaOH | APC | 60 | 100 | 14.3 |
| Synthesis Example 4 | Copolymer 4 | PMA | 40 | EA | MPC | 60 | 100 | 13.8 |
| Synthesis Example 5 | Copolymer 5 | PA | 40 | NaOH | MPC | 60 | 100 | 12.9 |
| Synthesis Example 6 | Copolymer 6 | PMA | 20 | NaOH | MPC | 80 | 100 | 4.3 |
| Synthesis Example 7 | Copolymer 7 | PMA | 10 | NaOH | MPC | 90 | 100 | 30.0 |
| Synthesis Example 8 | Copolymer 8 | PMA | 60 | NaOH | MPC | 40 | 100 | 4.0 |
| Synthesis Example 9 | Copolymer 9 | PMA | 60 | NaOH | MPC | 40 | 100 | 28.7 |
| Synthesis Example 10 | Copolymer 10 | PMA | 20 | NaOH | MPC | 80 | 100 | 3.1 |
| Synthesis Example 11 | Copolymer 11 | PMA | 10 | NaOH | MPC | 90 | 100 | 33.5 |
| Synthesis Example 12 | Copolymer 12 | PMA | 60 | NaOH | MPC | 40 | 100 | 3.3 |
| Synthesis Example 13 | Copolymer 13 | PMA | 60 | NaOH | MPC | 40 | 100 | 34.1 |
| Synthesis Example 14 | Copolymer 14 | PMA | 5 | NaOH | MPC | 95 | 100 | 2.9 |
| Synthesis Example 15 | Copolymer 15 | PMA | 5 | NaOH | MPC | 95 | 100 | 32.7 |
| Synthesis Example 16 | Copolymer 16 | PMA | 80 | NaOH | MPC | 20 | 100 | 3.0 |
| Synthesis Example 17 | Copolymer 17 | PMA | 80 | NaOH | MPC | 20 | 100 | 33.3 |
| Synthesis Example 18 | Copolymer 18 | PMA | 40 | DMEA | MPC | 60 | 100 | 14.1 |

*EA: Monoethanolamine  *DMEA: Dimethylethanolamine

TABLE 2

| | Copolymer | Structural unit 1 | | | Structural unit 2 | | Neutralization rate (%) | Viscosity of 10% by mass aqueous solution (mPa·s) |
| | | Monomer | Proportion (% by mass) | Neutralizing salt | Monomer | Proportion (% by mass) | | |
|---|---|---|---|---|---|---|---|---|
| Comparative Synthesis Example 1 | Comparative Copolymer 1 | Maleic acid | 50 | NaOH | Styrene | 50 | 100 | 13.5 |
| Comparative Synthesis Example 2 | Comparative Copolymer 2 | PMA | 50 | NaOH | Styrene | 50 | 100 | 14.4 |
| Comparative Synthesis Example 3 | Comparative Copolymer 3 | Maleic acid | 50 | NaOH | MPC | 50 | 100 | 14.1 |
| Comparative Synthesis Example 4 | Comparative Copolymer 4 | PMA | 40 | NaOH | MPC | 60 | 40 | 7.8 |

Synthesis Example A1

—Synthesis of Copolymer A1—

In a four-neck flask, 12.00 g of PMA, 4.00 g of MPC, 24.00 g of SMA, and 226.67 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained to by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A1. The viscosity of the aqueous solution of the obtained copolymer A1 was found to be 13.7 mPa·s at 25° C.

Synthesis Example A2

—Synthesis of Copolymer A2—

In a four-neck flask, 12.00 g of PMA, 4.00 g of MPC, 24.00 g of BzMA, and 226.67 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A2. The viscosity of the aqueous solution of the obtained copolymer A2 was found to be 14.3 mPa·s at 25° C.

Synthesis Example A3

—Synthesis of Copolymer A3—

In a four-neck flask, 12.00 g of PMA, 4.00 g of MPC, 24.00 g of SMA, and 226.67 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 50%. The mixture was purified with a dialysis membrane for 3 days, and the concentration of the mixture was accurately regulated to be 10% by mass after the purification. The mixture thus obtained was adopted as the aqueous solution of the copolymer A3. The viscosity of the aqueous solution of the obtained copolymer A3 was found to be 10.1 mPa·s at 25° C.

Synthesis Example A4

—Synthesis of Copolymer A4—

In a four-neck flask, 12.00 g of PMA, 4.00 g of APC, 24.00 g of SA, and 226.67 g of ethanol were placed and stirred to prepare a uniform solution. After nitrogen was blown into the solution for 30 minutes, 2.67 g of AIBN was added to the solution at 66° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A4. The viscosity of the aqueous solution of the obtained copolymer A4 was found to be 14.5 mPa·s at 25° C.

Synthesis Example A5

—Synthesis of Copolymer A5—

In a four-neck flask, 12.00 g of PMA, 4.00 g of MPC, 24.00 g of BzMA, and 226.67 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with monoethanolamine (EA) so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A5. The viscosity of the aqueous solution of the obtained copolymer A5 was found to be 13.5 mPa·s at 25° C.

Synthesis Example A6

—Synthesis of Copolymer A6—

In a four-neck flask, 12.00 g of PA, 4.00 g of MPC, 24.00 g of SMA, and 226.67 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A6. The viscosity of the aqueous solution of the obtained copolymer A6 was found to be 12.8 mPa·s at 25° C.

Synthesis Example A7

—Synthesis of Copolymer A7—

In a four-neck flask, 2.67 g of PMA, 2.67 g of MPC, 800 g of SMA, and 253.33 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A7. The viscosity of the aqueous solution of the obtained copolymer A7 was found to be 4.0 mPa·s at 25° C.

Synthesis Example A8

—Synthesis of Copolymer A8—

In a four-neck flask, 5.33 g of PMA, 13.33 g of MPC, 34.66 g of BzMA, and 213.33 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately to regulated to be 10% by mass after the purification. The mixture thus obtained was adopted as the aqueous solution of the copolymer A8. The viscosity of the aqueous solution of the obtained copolymer A8 was found to be 27.2 mPa·s at 25° C.

Synthesis Example A9

—Synthesis of Copolymer A9—

In a four-neck flask, 8.00 g of PMA, 2.00 g of MPC, 3.33 g of BzMA, and 253.33 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A9. The viscosity of the aqueous solution of the obtained copolymer A9 was found to be 6.2 mPa·s at 25° C.

Synthesis Example A10

—Synthesis of Copolymer A10—

In a four-neck flask, 32.00 g of PMA, 5.33 g of MPC, 16.00 g of SMA, and 213.33 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A10. The viscosity of the aqueous solution of the obtained copolymer A100 was found to be 30.0 mPa·s at 25° C.

Synthesis Example A11

—Synthesis of Copolymer A11—

In a four-neck flask, 2.13 g of PMA, 2.67 g of MPC, 5.87 g of BzMA, and 256.00 g of ethanol were placed and stirred to prepare a uniform solution. After nitrogen was blown into the solution for 30 minutes, 2.67 g of AIBN was added to the solution at 65° C., and the solution was allowed to undergo to polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A11. The viscosity of the aqueous solution of the obtained copolymer A11 was found to be 3.1 mPa·s at 25° C.

Synthesis Example A12

—Synthesis of Copolymer A12—

In a four-neck flask, 6.13 g of PMA, 12.26 g of MPC, 42.93 g of SMA, and 205.33 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A12. The viscosity of the aqueous solution of the obtained copolymer A12 was found to be 31.8 mPa·s at 25° C.

Synthesis Example A13

—Synthesis of Copolymer A13—

In a four-neck flask, 6.40 g of PMA, 2.13 g of MPC, 2.13 g of SMA, and 256.00 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A13. The viscosity of the aqueous solution of the obtained copolymer A13 was found to be 3.6 mPa·s at to 25° C.

Synthesis Example A14

—Synthesis of Copolymer A14—

In a four-neck flask, 36.80 g of PMA, 6.13 g of MPC, 18&4 g of BzMA, and 205.33 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A14. The viscosity of the aqueous solution of the obtained copolymer A14 was found to be 32.7 mPa·s at 25° C.

Synthesis Example A15

—Synthesis of Copolymer A15—

In a four-neck flask, 1.60 g of PMA, 9.60 g of MPC, 20.80 g of SMA, and 768.00 g of ethanol were placed and stirred to prepare a uniform solution. After nitrogen was blown into the solution for 30 minutes, 8.00 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A15. The viscosity of the aqueous solution of the obtained copolymer A16 was found to be 2.6 mPa·s at 25° C.

Synthesis Example A16

—Synthesis of Copolymer A16—

In a four-neck flask, 3.06 g of PMA, 15.33 g of MPC, 42.93 g of BzMA, and 206.33 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A16. The viscosity of the aqueous solution of the obtained copolymer A16 was found to be 31.2 mPa·s at 25° C.

Synthesis Example A17

—Synthesis of Copolymer A17—

In a four-neck flask, 8.53 g of PMA, 1.06 g of MPC, 1.06 g of SMA, and 256.00 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A17. The viscosity of the aqueous solution of the obtained copolymer A17 was found to be 4.7 mPa·s at 25° C.

Synthesis Example A18

—Synthesis of Copolymer A18—

In a four-neck flask, 49.06 g of PMA, 3.06 g of MPC, 9.20 g of BzMA, and 206.33 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A18. The viscosity of the aqueous solution of the obtained copolymer A18 was found to be 34.7 mPa·s at 25° C.

Synthesis Example A19

—Synthesis of Copolymer A19—

In a four-neck flask, 12.00 g of PMA, 4.00 g of MPC, 24.00 g of BzMA, and 226.67 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with dimethylethanolamine (DMEA) so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the copolymer A19. The viscosity of the aqueous solution of the obtained copolymer A19 was found to be 14.2 mPa·s at 25° C.

Comparative Synthesis Example A1

—Synthesis of Comparative Copolymer A1—

In a four-neck flask, 100 g of maleic acid, 100 g of styrene, 500 g of water, and 15 g of ammonium persulfate were placed and stirred to prepare a uniform solution. After nitrogen was blown into the solution for 30 minutes, 2 g of AIBN was added to the solution at 80° C. to 9° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration-regulated mixture was neutralized with sodium hydroxide so as for the neutralization rate to be 100%. The mixture was purified with a dialysis membrane for 3 days, and the concentration of the mixture was accurately regulated to be 10% by mass after the purification. The mixture thus obtained was adopted as the aqueous solution of the comparative copolymer A1. The viscosity of the aqueous solution of the obtained comparative copolymer A1 was found to be 13.5 mPa·s at 25° C.

Comparative Synthesis Example A2

—Synthesis of Comparative Copolymer A2—

An aqueous solution of the comparative copolymer A2 was obtained in the same manner as in Synthesis of Comparative Copolymer A1 except that maleic acid and styrene in Comparative Synthesis Example A1 were replaced with PMA and styrene. The viscosity of the aqueous solution of the obtained comparative copolymer A2 was found to be 14.4 mPa·s at 25° C.

Comparative Synthesis Example A3

—Synthesis of Comparative Copolymer A3—

An aqueous solution of the comparative copolymer A3 was obtained in the same manner as in Synthesis of Comparative Copolymer A1 except that maleic acid and styrene in Comparative Synthesis Example A1 were replaced with maleic acid and MPC. The viscosity of the aqueous solution of the obtained comparative copolymer A3 was found to be 14.1 mPa·s at 25° C.

Comparative Synthesis Example A4

—Synthesis of Comparative Copolymer A4—

In a four-neck flask, 12.00 g of PMA, 4.00 g of MPC, 24.00 g of SMA, and 226.67 g of ethanol were placed and stirred to prepare a uniform solution. After nitrogen was blown into the solution for 30 minutes, 2.67 g of AIBN was added to the solution at 65° C., and the solution was allowed to undergo polymerization reaction for 5 hours or more. The viscous substance obtained by removing the solvent with an evaporator from the polymerization solution. While the viscous substance was being diluted with water, the concentration of the resulting mixture was regulated to be 10% by mass, and the concentration regulated mixture was neutralized with sodium hydroxide so as for the neutralization rate to be 40%. The mixture was purified with a dialysis membrane for 3 days, and the concentration of the mixture was accurately regulated to be 10% by mass after the purification. The mixture thus obtained was adopted as the aqueous solution of the comparative copolymer A4. The viscosity of the aqueous solution of the obtained comparative copolymer A4 was found to be 8.4 mPa·s at 25° C.

Next, the copolymers of Synthesis Examples A1 to A19 and Comparative Synthesis Examples A1 to A4 are listed in Table A1 and Table A2.

TABLE A1-1

| | Copolymer | Structural unit represented by general formula (1) | | | Structural unit represented by general formula (2) | |
|---|---|---|---|---|---|---|
| | | Monomer | Proportion (% by mass) | Neutralizing salt | Monomer | Proportion (% by mass) |
| Synthesis Example A1 | Copolymer A1 | PMA | 30 | NaOH | MPC | 10 |
| Synthesis Example A2 | Copolymer A2 | PMA | 30 | NaOH | MPC | 10 |
| Synthesis Example A3 | Copolymer A3 | PMA | 30 | NaOH | MPC | 10 |
| Synthesis Example A4 | Copolymer A4 | PMA | 30 | NaOH | APC | 10 |
| Synthesis Example A5 | Copolymer A5 | PMA | 30 | EA | MPC | 10 |
| Synthesis Example A6 | Copolymer A6 | PA | 30 | NaOH | MPC | 10 |
| Synthesis Example A7 | Copolymer A7 | PMA | 20 | NaOH | MPC | 20 |
| Synthesis Example A8 | Copolymer A8 | PMA | 20 | NaOH | MPC | 15 |
| Synthesis Example A9 | Copolymer A9 | PMA | 60 | NaOH | MPC | 15 |
| Synthesis Example A10 | Copolymer A10 | PMA | 60 | NaOH | MPC | 10 |
| Synthesis Example A11 | Copolymer A11 | PMA | 20 | NaOH | MPC | 25 |
| Synthesis Example A12 | Copolymer A12 | PMA | 20 | NaOH | MPC | 20 |
| Synthesis Example A13 | Copolymer A13 | PMA | 60 | NaOH | MPC | 20 |
| Synthesis Example A14 | Copolymer A14 | PMA | 60 | NaOH | MPC | 10 |
| Synthesis Example A15 | Copolymer A15 | PMA | 10 | NaOH | MPC | 30 |
| Synthesis Example A16 | Copolymer A16 | PMA | 10 | NaOH | MPC | 20 |
| Synthesis Example A17 | Copolymer A17 | PMA | 80 | NaOH | MPC | 10 |
| Synthesis Example A18 | Copolymer A18 | PMA | 80 | NaOH | MPC | 5 |
| Synthesis Example A19 | Copolymer A19 | PMA | 30 | DMEA | MPC | 10 |

*EA: Monoethanolamine
*DMEA: Dimethylethanolamine

TABLE A1-2

| | Copolymer | Structural unit represented by general formula (3) or (4) | | | Viscosity of 10% by mass aqueous solution (mPa · s) |
|---|---|---|---|---|---|
| | | Structural unit | Proportion (% by mass) | Neutralization rate (%) | |
| Synthesis Example A1 | Copolymer A1 | SMA | 60 | 100 | 13.7 |
| Synthesis Example A2 | Copolymer A2 | BzMA | 60 | 100 | 14.3 |
| Synthesis Example A3 | Copolymer A3 | SMA | 60 | 50 | 10.1 |
| Synthesis Example A4 | Copolymer A4 | SA | 60 | 100 | 14.5 |
| Synthesis Example A5 | Copolymer A5 | BzMA | 60 | 100 | 13.5 |
| Synthesis Example A6 | Copolymer A6 | SMA | 60 | 100 | 12.8 |
| Synthesis Example A7 | Copolymer A7 | SMA | 60 | 100 | 4.0 |
| Synthesis Example A8 | Copolymer A8 | BzMA | 65 | 100 | 27.2 |
| Synthesis Example A9 | Copolymer A9 | BzMA | 25 | 100 | 6.2 |

TABLE A1-2-continued

| Copolymer | | Structural unit represented by general formula (3) or (4) | | Neutralization rate (%) | Viscosity of 10% by mass aqueous solution (mPa·s) |
|---|---|---|---|---|---|
| | | Structural unit | Proportion (% by mass) | | |
| Synthesis Example A10 | Copolymer A10 | SMA | 30 | 100 | 30.0 |
| Synthesis Example A11 | Copolymer A11 | BzMA | 55 | 100 | 3.1 |
| Synthesis Example A12 | Copolymer A12 | SMA | 60 | 100 | 31.8 |
| Synthesis Example A13 | Copolymer A13 | SMA | 20 | 100 | 3.6 |
| Synthesis Example A14 | Copolymer A14 | BzMA | 30 | 100 | 32.7 |
| Synthesis Example A15 | Copolymer A15 | SMA | 60 | 100 | 2.6 |
| Synthesis Example A16 | Copolymer A16 | BzMA | 65 | 100 | 31.2 |
| Synthesis Example A17 | Copolymer A17 | SMA | 10 | 100 | 4.7 |
| Synthesis Example A18 | Copolymer A18 | BzMA | 15 | 100 | 34.7 |
| Synthesis Example A19 | Copolymer A19 | BzMA | 60 | 100 | 14.2 |

TABLE A2-1

| | | Structural unit 1 | | | Structural unit 2 | |
|---|---|---|---|---|---|---|
| | Copolymer | Monomer | Proportion (% by mass) | Neutralizing salt | Monomer | Proportion (% by mass) |
| Comparative Synthesis Example A1 | Comparative Copolymer A1 | Maleic acid | 50 | NaOH | Styrene | 50 |
| Comparative Synthesis Example A2 | Comparative Copolymer A2 | PMA | 50 | NaOH | Styrene | 50 |
| Comparative Synthesis Example A3 | Comparative Copolymer A3 | Maleic acid | 50 | NaOH | MPC | 50 |
| Comparative Synthesis Example A4 | Comparative Copolymer A4 | PMA | 30 | NaOH | MPC | 10 |

TABLE A2-2

| | | Structural unit 3 | | | Viscosity of 10% by mass aqueous solution (mPa·s) |
|---|---|---|---|---|---|
| | Copolymer | Monomer | Proportion (% by mass) | Neutralizing rate (%) | |
| Comparative Synthesis Example A1 | Comparative Copolymer A1 | — | — | 100 | 13.5 |
| Comparative Synthesis Example A2 | Comparative Copolymer A2 | — | — | 100 | 14.4 |
| Comparative Synthesis Example A3 | Comparative Copolymer A3 | — | — | 100 | 14.1 |
| Comparative Synthesis Example A4 | Comparative Copolymer A4 | BzMA | 60 | 40 | 8.4 |

Pigment Dispersion Preparation Example 1

—Preparation of Pigment Dispersion 1—
On the basis of the following formulation (1), a mixture composed of the following carbon black pigment, copolymer and pure water was premixed, and then the mixture was subjected to a circulation dispersion with a disc-type bead mill (KDL type, manufactured by Shinmaru Enterprises Corp., media used: zirconia balls of 0.1 mm in diameter) at a circumferential speed of 10 m/s for 10 minutes to yield a black pigment dispersion.
—Formulation (1)—
Carbon black pigment (NIPEX150, gas black, manufactured by Evonik Gegussa GmbH): 20 parts by mass
Aqueous solution of copolymer 1 (solid content: 10.0% by mass): 75 parts by mass
Pure water: 5 parts by mass Pigment Dispersion Preparation Example 2

—Preparation of Pigment Dispersion 2—
The pigment dispersion 2 was obtained in the same manner as in Pigment Dispersion Preparation Example 1 except that the carbon black pigment in Pigment Dispersion Preparation Example 1 was replaced with Pigment Blue 15:3.

Pigment Dispersion Preparation Example 3

—Preparation of Pigment Dispersion 3—
The pigment dispersion 3 was obtained in the same manner as in Pigment Dispersion Preparation Example 1 except that the carbon black pigment in Pigment Dispersion Preparation Example 1 was replaced with Pigment Red 122.

Pigment Dispersion Preparation Example 4

—Preparation of Pigment Dispersion 4—
The pigment dispersion 4 was obtained in the same manner as in Pigment Dispersion Preparation Example 1 except that the carbon black pigment in Pigment Dispersion Preparation Example 1 was replaced with Pigment Yellow 74.

Pigment Dispersion Preparation Example 5

—Preparation of Pigment Dispersion 5—
The pigment dispersion 5 was obtained in the same manner as in Pigment Dispersion Preparation Example 1 except that the aqueous solution of the copolymer 1 of Pigment Dispersion Preparation Example 1 was replaced with the aqueous solution of the copolymer 2.

Pigment Dispersion Preparation Example 6

—Preparation of Pigment Dispersion 6—
The pigment dispersion 6 was obtained in the same manner as in Pigment Dispersion Preparation Example 1 except that the aqueous solution of the copolymer 1 of Pigment Dispersion Preparation Example 1 was replaced with the aqueous solution of the copolymer 3.

Pigment Dispersion Preparation Example 7

—Preparation of Pigment Dispersion 7—
The pigment dispersion 7 was obtained in the same manner as in Pigment Dispersion Preparation Example 1 except that the aqueous solution of the copolymer 1 of Pigment Dispersion Preparation Example 1 was replaced with the aqueous solution of the copolymer 4.

Pigment Dispersion Preparation Example 8

—Preparation of Pigment Dispersion 8—
The pigment dispersion 8 was obtained in the same manner as in Pigment Dispersion Preparation Example 1 except that the aqueous solution of the copolymer 1 of Pigment Dispersion Preparation Example 1 was replaced with the aqueous solution of the copolymer 5.

Pigment Dispersion Preparation Example 9

—Preparation of Pigment Dispersion 9—
The pigment dispersion 9 was obtained in the same manner as in Pigment Dispersion Preparation Example 9 except that the carbon black pigment in Pigment Dispersion Preparation Example 9 was replaced with Pigment Blue 15:3.

Pigment Dispersion Preparation Example 10

—Preparation of Pigment Dispersion 10—
The pigment dispersion 10 was obtained in the same manner as in Pigment Dispersion Preparation Example 9 except that the carbon black pigment in Pigment Dispersion Preparation Example 9 was replaced with Pigment Red 122.

Pigment Dispersion Preparation Example 11

—Preparation of Pigment Dispersion 11—
The pigment dispersion 11 was obtained in the same manner as in Pigment Dispersion Preparation Example 9 except that the carbon black pigment in Pigment Dispersion Preparation Example 9 was replaced with Pigment Yellow 74.

Pigment Dispersion Preparation Examples 12 to 24

—Preparation of Pigment Dispersions 12 to 24—
The pigment dispersions 12 to 24 were obtained in the same manner as in Pigment Dispersion Preparation Example 1 except that the aqueous solution of the copolymer 1 of Pigment Dispersion Preparation Example 1 was replaced with the aqueous solution of the copolymers 6 to 18.

Comparative Preparation Example 1 of Pigment Dispersion

—Synthesis of Comparative Pigment Dispersion 1—
The comparative pigment dispersion 1 was obtained in the same manner as in Pigment Dispersion Preparation Example 1 except that the aqueous solution of the copolymer 1 of Pigment Dispersion Preparation Example 1 was replaced with the aqueous solution of the comparative copolymer 1.

Comparative Preparation Example 2 of Pigment Dispersion

—Synthesis of Comparative Pigment Dispersion 2—
The comparative pigment dispersion 2 was obtained in the same manner as in Pigment Dispersion Preparation Example 3 except that the aqueous solution of the copolymer 1 of Pigment Dispersion Preparation Example 3 was replaced with the aqueous solution of the comparative copolymer 1.

Comparative Preparation Example 3 of Pigment Dispersion

—Synthesis of Comparative Pigment Dispersion 3—
The comparative pigment dispersion 3 was obtained in the same manner as in Pigment Dispersion Preparation Example 4 except that the aqueous solution of the copolymer 1 of Pigment Dispersion Preparation Example 4 was replaced with the aqueous solution of the comparative copolymer 1.

Comparative Preparation Example 4 of Pigment Dispersion

—Synthesis of Comparative Pigment Dispersion 4—
The comparative pigment dispersion 4 was obtained in the same manner as in Pigment Dispersion Preparation Example 5 except that the aqueous solution of the copolymer 1 of Pigment Dispersion Preparation Example 5 was replaced with the aqueous solution of the comparative copolymer 1.

Comparative Preparation Example 5 of Pigment Dispersion

—Synthesis of Comparative Pigment Dispersion 5—
The comparative pigment dispersion 5 was obtained in the same manner as in Comparative Preparation Example 1 of Pigment Dispersion except that the aqueous solution of the comparative copolymer 1 of Comparative Preparation Example 1 of Pigment Dispersion was replaced with the aqueous solution of the comparative copolymer 2.

Comparative Preparation Example 6 of Pigment Dispersion

—Synthesis of Comparative Pigment Dispersion 6—
The comparative pigment dispersion 6 was obtained in the same manner as in Comparative Preparation Example 1 except that the aqueous solution of the comparative copolymer 1 of Comparative Preparation Example 1 of Pigment Dispersion was replaced with the aqueous solution of the comparative copolymer 3.

Comparative Preparation Example 7 of Pigment Dispersion

—Synthesis of Comparative Pigment Dispersion 7—
The comparative pigment dispersion 7 was obtained in the same manner as in Comparative Preparation Example 1 except that the aqueous solution of the comparative copolymer 1 of Comparative Preparation Example 1 of Pigment Dispersion was replaced with the aqueous solution of the comparative copolymer 4.

Example 1

—Preparation of Inkjet Recording Ink—
The materials in the following formulation were mixed and stirred for 30 minutes to prepare an inkjet recording ink.
Pigment dispersion 1 (pigment concentration: 20% by mass) of Pigment Dispersion Preparation Example 1: 44.4 parts by mass
1,3-Butanediol: 15.0 parts by mass
Glycerin: 20.0 parts by mass
2-Ethyl-1,3-hexanediol: 1.0 part by mass
2,2-Trimethyl-1.3-pentanediol: 1.0 part by mass
Polyoxyethylene perfluoroalkyl ether (FS-300, manufactured by Dupont Corp.), component: 40% by mass): 2.5 parts by mass
Pure water: 16.1 parts by mass Examples 2

—Preparation of Inkjet Recording Ink—
The materials in the following formulation were mixed and stirred for 30 minutes to prepare an ink.
Pigment dispersion 1 (pigment concentration: 20% by mass) of Pigment Dispersion Preparation Example 1: 44.4 parts by mass
1,3-Butanediol: 15.0 parts by mass
Glycerin: 20.0 parts by mass
2-Ethyl-1,3-hexanediol: 1.0 part by mass
2,2-Trimethyl-1.3-pentanediol: 1.0 part by mass
Polyoxyethylene perfluoroalkyl ether (FS-300, manufactured by DuPont Corp.), component: 40% by mass): 2.5 parts by mass
Acrylic-silicone resin emulsion (Polysol ROY6312, manufactured by Showa Highpolymer Co., Ltd.): 6.0 parts by mass
Pure water: 10.1 parts by mass Example 3

—Preparation of Inkjet Recording Ink—
The materials in the following formulation were mixed and stirred for 30 minutes to prepare an inkjet recording ink.
Pigment dispersion 2 (pigment concentration: 20% by mass) of Pigment Dispersion Preparation Example 2: 33.3 parts by mass
1,3-Butanediol: 15.0 parts by mass
Glycerin: 20.0 parts by mass
2-Ethyl-1,3-hexanediol: 2.0 part by mass
Polyoxyethylene perfluoroalkyl ether (FS-300, manufactured by DuPont Corp), component: 40% by mass): 2.5 parts by mass
Pure water: 27.2 parts by mass Example 4

—Preparation of Inkjet Recording Ink—
The materials in the following formulation were mixed and stirred for 30 minutes to prepare an inkjet recording ink.
Pigment dispersion 3 (pigment concentration: 20% by mass) of Pigment Dispersion Preparation Example 3: 33.3 parts by mass
1,3-Butanediol: 15.0 parts by mass
Glycerin: 20.0 parts by mass
2-Ethyl-1,3-hexanediol: 2.0 part by mass
Polyoxyethylene perfluoroalkyl ether (FS-300, manufactured by Dupont Corp), component: 40% by mass): 2.5 parts by mass
Pure water: 27.2 parts by mass Example 5

—Preparation of Inkjet Recording Ink—
The materials in the following formulation were mixed and stirred for 30 minutes to prepare an inkjet recording ink.
Pigment dispersion 4 (pigment concentration: 20% by mass) of Pigment Dispersion Preparation Example 4: 33.3 parts by mass
1,3-Butanediol: 15.0 parts by mass
Glycerin: 20.0 parts by mass
2-Ethyl-1,3-hexanediol: 2.0 part by mass
Polyoxyethylene perfluoroalkyl ether (FS-300, manufactured by Dupont Corp), component: 40% by mass): 2.5 parts by mass
Pure water: 27.2 parts by mass Examples 6 to 8

—Preparation of Inkjet Recording Ink—
The inks of Examples 6 to 8 were prepared in the same manner as in Example 1 except that the pigment dispersion 1 in Example 1 was replaced with the pigment dispersions 5 to 7 respectively in Examples 6 to 8.

Examples 9 to 13

—Preparation of Inkjet Recording Ink—
The inks of Examples 9 to 13 were prepared in the same manner as in Example 1 except that the pigment dispersions 1 to 4 in Examples 1 to 5 was replaced with the pigment dispersions 8 to 11 respectively in Examples 9 to 13.

Examples 14 to 26

—Preparation of Inkjet Recording Ink—
The inks of Examples 14 to 26 were prepared in the same manner as in Example 1 except that the pigment dispersion 1 in Example 1 was replaced with the pigment dispersions 12 to 24 respectively in Examples 14 to 26.

Comparative Example 1

—Preparation of Inkjet Recording Ink—
The ink of Comparative Example 1 was prepared in the same manner as in Example 1 except that the pigment dispersion 1 in Example 1 was replaced with the comparative pigment dispersion 1.

Comparative Example 2

—Preparation of Inkjet Recording Ink—
The ink of Comparative Example 2 was prepared in the same manner as in Example 1 except that the pigment dispersion 1 in Example 3 was replaced with the comparative pigment dispersion 2.

Comparative Example 3

—Preparation of Inkjet Recording Ink—

The ink of Comparative Example 3 was prepared in the same manner as in Example 1 except that the pigment dispersion 1 in Example 4 was replaced with the comparative pigment dispersion 3.

Comparative Example 4

—Preparation of Inkjet Recording Ink—

The ink of Comparative Example 4 was obtained in the same manner as in Example 1 except that the pigment dispersion 1 in Example 5 was replaced with the comparative pigment dispersion 4.

Comparative Example 5

—Preparation of Inkjet Recording Ink—

The ink of Comparative Example 5 was prepared in the same manner as in Example 1 except that the pigment dispersion 1 in Example 1 was replaced with the comparative pigment dispersion 5.

Comparative Example 6

—Preparation of Inkjet Recording Ink—

The ink of Comparative Example 6 was prepared in the same manner as in Example 1 except that the pigment dispersion 1 in Example 1 was replaced with the comparative pigment dispersion 6.

Comparative Example 7

—Preparation of Inkjet Recording Ink—

The ink of Comparative Example 7 was prepared in the same manner as in Example 1 except that the pigment dispersion 1 in Example 1 was replaced with the comparative pigment dispersion 7.

Next, the contents of Examples are collectively shown in Tables 3-1 to 3-3, and the contents of Comparative Examples are collectively shown in Table 4. The numerical values in Tables 3-1 to 3-3, and Table 4 are given in percent by mass.

TABLE 3-1

| | | Examples | | | | | | | | |
|---|---|---|---|---|---|---|---|---|---|---|
| | | 1 | 2 | 3 | 4 | 5 | 6 | 7 | 8 | 9 |
| Pigment dispersions | Pigment dispersion 1 | 44.4 | 44.4 | — | — | — | — | — | — | — |
| | Pigment dispersion 2 | — | — | 33.3 | — | — | — | — | — | — |
| | Pigment dispersion 3 | — | — | — | 33.3 | — | — | — | — | — |
| | Pigment dispersion 4 | — | — | — | — | 33.3 | — | — | — | — |
| | Pigment dispersion 5 | — | — | — | — | — | 44.4 | — | — | — |
| | Pigment dispersion 6 | — | — | — | — | — | — | 44.4 | — | — |
| | Pigment dispersion 7 | — | — | — | — | — | — | — | 44.4 | — |
| | Pigment dispersion 8 | — | — | — | — | — | — | — | — | 44.4 |
| | Pigment dispersion 9 | — | — | — | — | — | — | — | — | — |
| | Pigment dispersion 10 | — | — | — | — | — | — | — | — | — |
| | Pigment dispersion 11 | — | — | — | — | — | — | — | — | — |
| | Pigment dispersion 12 | — | — | — | — | — | — | — | — | — |
| | Pigment dispersion 13 | — | — | — | — | — | — | — | — | — |
| | Pigment dispersion 14 | — | — | — | — | — | — | — | — | — |
| | Pigment dispersion 15 | — | — | — | — | — | — | — | — | — |
| | Pigment dispersion 16 | — | — | — | — | — | — | — | — | — |
| | Pigment dispersion 17 | — | — | — | — | — | — | — | — | — |
| | Pigment dispersion 18 | — | — | — | — | — | — | — | — | — |
| | Pigment dispersion 19 | — | — | — | — | — | — | — | — | — |
| | Pigment dispersion 20 | — | — | — | — | — | — | — | — | — |
| | Pigment dispersion 21 | — | — | — | — | — | — | — | — | — |
| | Pigment dispersion 22 | — | — | — | — | — | — | — | — | — |
| | Pigment dispersion 23 | — | — | — | — | — | — | — | — | — |
| | Pigment dispersion 24 | — | — | — | — | — | — | — | — | — |
| Water-soluble solvents | 1,3-Butanediol | 15 | 15 | 15 | 15 | 15 | 15 | 15 | 15 | 15 |
| | Glycerin | 20 | 20 | 20 | 20 | 20 | 20 | 20 | 20 | 20 |
| Penetrating agents | 2-Ethyl-1,3-hexanediol | 1 | 1 | 2 | 2 | 2 | 1 | 1 | 2 | 2 |
| | 2,2-Trimethyl-1,3-pentanediol | 1 | 1 | 0 | 0 | 0 | 1 | 1 | 0 | 0 |
| Surfactant | FS-300 | 2.5 | 2.5 | 2.5 | 2.5 | 2.5 | 2.5 | 2.5 | 2.5 | 2.5 |
| Water-dispersible resin | Acrylic-silicone resin emulsion | 0 | 6 | 0 | 0 | 0 | 0 | 0 | 0 | 0 |
| Pure water | | 16.1 | 10.1 | 27.2 | 27.2 | 27.2 | 16.1 | 16.1 | 16.1 | 16.1 |
| Total (% by mass) | | 100 | 100 | 100 | 100 | 100 | 100 | 100 | 100 | 100 |

TABLE 3-2

| | | Examples | | | | | | | | |
|---|---|---|---|---|---|---|---|---|---|---|
| | | 10 | 11 | 12 | 13 | 14 | 15 | 16 | 17 | 18 |
| Pigment dispersion | Pigment dispersion 1 | — | — | — | — | — | — | — | — | — |
| | Pigment dispersion 2 | — | — | — | — | — | — | — | — | — |
| | Pigment dispersion 3 | — | — | — | — | — | — | — | — | — |
| | Pigment dispersion 4 | — | — | — | — | — | — | — | — | — |
| | Pigment dispersion 5 | — | — | — | — | — | — | — | — | — |
| | Pigment dispersion 6 | — | — | — | — | — | — | — | — | — |
| | Pigment dispersion 7 | — | — | — | — | — | — | — | — | — |
| | Pigment dispersion 8 | 44.4 | — | — | — | — | — | — | — | — |
| | Pigment dispersion 9 | — | 33.3 | — | — | — | — | — | — | — |
| | Pigment dispersion 10 | — | — | 33.3 | — | — | — | — | — | — |
| | Pigment dispersion 11 | — | — | — | 33.3 | — | — | — | — | — |
| | Pigment dispersion 12 | — | — | — | — | 44.4 | — | — | — | — |
| | Pigment dispersion 13 | — | — | — | — | — | 44.4 | — | — | — |
| | Pigment dispersion 14 | — | — | — | — | — | — | 44.4 | — | — |
| | Pigment dispersion 15 | — | — | — | — | — | — | — | 44.4 | — |
| | Pigment dispersion 16 | — | — | — | — | — | — | — | — | 44.4 |
| | Pigment dispersion 17 | — | — | — | — | — | — | — | — | — |
| | Pigment dispersion 18 | — | — | — | — | — | — | — | — | — |
| | Pigment dispersion 19 | — | — | — | — | — | — | — | — | — |
| | Pigment dispersion 20 | — | — | — | — | — | — | — | — | — |
| | Pigment dispersion 21 | — | — | — | — | — | — | — | — | — |
| | Pigment dispersion 22 | — | — | — | — | — | — | — | — | — |
| | Pigment dispersion 23 | — | — | — | — | — | — | — | — | — |
| | Pigment dispersion 24 | — | — | — | — | — | — | — | — | — |
| Water-soluble solvents | 1,3-Butanediol | 15 | 15 | 15 | 15 | 15 | 15 | 15 | 15 | 15 |
| | Glycerin | 20 | 20 | 20 | 20 | 20 | 20 | 20 | 20 | 20 |
| Penetrating agents | 2-Ethyl-1,3-hexanediol | 2 | 1 | 1 | 1 | 1 | 1 | 2 | 2 | 2 |
| | 2,2-Trimethyl-1,3-pentanediol | 0 | 1 | 1 | 1 | 1 | 1 | 0 | 0 | 0 |
| Surfactant | FS-300 | 2.5 | 2.5 | 2.5 | 2.5 | 2.5 | 2.5 | 2.5 | 2.5 | 2.5 |
| Water dispersible resin | Acrylic-silicone resin emulsion | 6 | 0 | 0 | 0 | 0 | 0 | 0 | 0 | 0 |
| Pure water | | 10.1 | 27.2 | 27.2 | 27.2 | 16.1 | 16.1 | 16.1 | 16.1 | 16.1 |
| Total (% by mass) | | 100 | 100 | 100 | 100 | 100 | 100 | 100 | 100 | 100 |

TABLE 3-3

| | | Examples | | | | | | | |
|---|---|---|---|---|---|---|---|---|---|
| | | 19 | 20 | 21 | 22 | 23 | 24 | 25 | 26 |
| Pigment dispersion | Pigment dispersion 1 | — | — | — | — | — | — | — | — |
| | Pigment dispersion 2 | — | — | — | — | — | — | — | — |
| | Pigment dispersion 3 | — | — | — | — | — | — | — | — |
| | Pigment dispersion 4 | — | — | — | — | — | — | — | — |
| | Pigment dispersion 5 | — | — | — | — | — | — | — | — |
| | Pigment dispersion 6 | — | — | — | — | — | — | — | — |
| | Pigment dispersion 7 | — | — | — | — | — | — | — | — |
| | Pigment dispersion 8 | — | — | — | — | — | — | — | — |
| | Pigment dispersion 9 | — | — | — | — | — | — | — | — |
| | Pigment dispersion 10 | — | — | — | — | — | — | — | — |
| | Pigment dispersion 11 | — | — | — | — | — | — | — | — |
| | Pigment dispersion 12 | — | — | — | — | — | — | — | — |
| | Pigment dispersion 13 | — | — | — | — | — | — | — | — |
| | Pigment dispersion 14 | — | — | — | — | — | — | — | — |
| | Pigment dispersion 15 | — | — | — | — | — | — | — | — |
| | Pigment dispersion 16 | — | — | — | — | — | — | — | — |
| | Pigment dispersion 17 | 44.4 | — | — | — | — | — | — | — |
| | Pigment dispersion 18 | — | 44.4 | — | — | — | — | — | — |
| | Pigment dispersion 19 | — | — | 44.4 | — | — | — | — | — |
| | Pigment dispersion 20 | — | — | — | 44.4 | — | — | — | — |
| | Pigment dispersion 21 | — | — | — | — | 44.4 | — | — | — |
| | Pigment dispersion 22 | — | — | — | — | — | 44.4 | — | — |
| | Pigment dispersion 23 | — | — | — | — | — | — | 44.4 | — |
| | Pigment dispersion 24 | — | — | — | — | — | — | — | 44.4 |
| Water-soluble solvents | 1,3-Butanediol | 15 | 15 | 15 | 15 | 15 | 15 | 15 | 15 |
| | Glycerin | 20 | 20 | 20 | 20 | 20 | 20 | 20 | 20 |

TABLE 3-3-continued

|  |  | Examples | | | | | | | |
|---|---|---|---|---|---|---|---|---|---|
|  |  | 19 | 20 | 21 | 22 | 23 | 24 | 25 | 26 |
| Penetrating agents | 2-Ethyl-1,3-hexanediol | 1 | 1 | 1 | 1 | 1 | 1 | 1 | 1 |
|  | 2,2-Trimethyl-1,3-pentanediol | 1 | 1 | 1 | 1 | 1 | 1 | 1 | 1 |
| Surfactant | FS-300 | 2.5 | 2.5 | 2.5 | 2.5 | 2.5 | 2.5 | 2.5 | 2.5 |
| Water-dispersible resin | Acrylic-silcone resin emulsion | 0 | 0 | 0 | 0 | 0 | 0 | 0 | 0 |
| Pure water |  | 16.1 | 16.1 | 16.1 | 16.1 | 16.1 | 16.1 | 16.1 | 16.1 |
| Total (% by mass) |  | 100 | 100 | 100 | 100 | 100 | 100 | 100 | 100 |

TABLE 4

|  |  | Comparative Examples | | | | | | |
|---|---|---|---|---|---|---|---|---|
|  |  | 1 | 2 | 3 | 4 | 5 | 6 | 7 |
| Pigment dispersion | Comparative Pigment dispersion 1 | 44.4 | — | — | — | — | — | — |
|  | Comparative Pigment dispersion 2 | — | 33.3 | — | — | — | — | — |
|  | Comparative Pigment dispersion 3 | — | — | 33.3 | — | — | — | — |
|  | Comparative Pigment dispersion 4 | — | — | — | 33.3 | — | — | — |
|  | Comparative Pigment dispersion 5 | — | — | — | — | 44.4 | — | — |
|  | Comparative Pigment dispersion 6 | — | — | — | — | — | 44.4 | — |
|  | Comparative Pigment dispersion 7 | — | — | — | — | — | — | 44.4 |
| Water-soluble solvents | 1,3-Butanediol | 15 | 15 | 15 | 15 | 15 | 15 | 15 |
|  | Glycerin | 20 | 20 | 20 | 20 | 20 | 20 | 20 |
| Penetrating agents | 2-Ethyl-1,3-hexanediol | 1 | 2 | 2 | 2 | 1 | 1 | 1 |
|  | 2,2-Trimethyl-1,3-pentanediol | 1 | 0 | 0 | 0 | 1 | 1 | 1 |
| Surfactant | FS-300 | 2.5 | 2.5 | 2.5 | 2.5 | 2.5 | 2.5 | 2.5 |
| Water-dispersible resin | Acrylic-silicone resin emulsion | 0 | 0 | 0 | 0 | 0 | 0 | 0 |
| Pure water |  | 16.1 | 27.2 | 27.2 | 27.2 | 16.1 | 16.1 | 16.1 |
| Total (% by mass) |  | 100 | 100 | 100 | 100 | 100 | 100 | 100 |

Pigment Dispersion Preparation Example A1

—Preparation of Pigment Dispersion A1—

On the basis of the following formulation (1), a mixture composed of the following carbon black pigment, copolymer and pure water was premixed, and then the mixture was subjected to a circulation dispersion with a disc type bead mill (KDL type, manufactured by Shinmaru Enterprises Corp., media used: zirconia balls of 0.1 mm in diameter) at a circumferential speed of 10 m/s for 10 minutes to yield a black pigment dispersion.

—Formulation (1)—

Carbon black pigment (NIPEX150, gas black, manufactured by Evonik Gegussa GmbH): 20 parts by mass
Aqueous solution of copolymer A1 (solid content: 10.0% by mass): 75 parts by mass
Pure water: 5 parts by mass Pigment Dispersion Preparation Example A2

—Preparation of Pigment Dispersion A2—

The pigment dispersion A2 was obtained in the same manner as in Pigment Dispersion Preparation Example A1 except that the carbon black pigment in Pigment Dispersion Preparation Example A1 was replaced with Pigment Blue 15:3.

Pigment Dispersion Preparation Example A3

—Preparation of Pigment Dispersion A3—

The pigment dispersion A3 was obtained in the same manner as in Pigment Dispersion Preparation Example A1 except that the carbon black pigment in Pigment Dispersion Preparation Example A1 was replaced with Pigment Red 122.

Pigment Dispersion Preparation Example A4

—Preparation of Pigment Dispersion A4—

The pigment dispersion A4 was obtained in the same manner as in Pigment Dispersion Preparation Example A1 except that the carbon black pigment in Pigment Dispersion Preparation Example A1 was replaced with Pigment Yellow 74.

Pigment Dispersion Preparation Example A5

—Preparation of Pigment Dispersion A5—

The pigment dispersion A5 was obtained in the same manner as in Pigment Dispersion Preparation Example A1 except that the aqueous solution of the copolymer A1 in Pigment Dispersion Preparation Example A1 was replaced with the aqueous solution of the copolymer A2.

Pigment Dispersion Preparation Example A6

—Preparation of Pigment Dispersion A6—

The pigment dispersion A6 was obtained in the same manner as in Pigment Dispersion Preparation Example A5 except that the carbon black pigment in Pigment Dispersion Preparation Example A5 was replaced with Pigment Blue 15:3.

Pigment Dispersion Preparation Example A7

—Preparation of Pigment Dispersion A7—

The pigment dispersion A7 was obtained in the same manner as in Pigment Dispersion Preparation Example A5 except that the carbon black pigment in Pigment Dispersion Preparation Example A5 was replaced with Pigment Red 122.

Pigment Dispersion Preparation Example A8

—Preparation of Pigment Dispersion A5—

The pigment dispersion A8 was obtained in the same manner as in Pigment Dispersion Preparation Example A5 except that the carbon black pigment in Pigment Dispersion Preparation Example A5 was replaced with Pigment Yellow 74.

Pigment Dispersion Preparation Example A9

—Preparation of Pigment Dispersion A9—

The pigment dispersion A9 was obtained in the same manner as in Pigment Dispersion Preparation Example A1 except that the aqueous solution to of the copolymer A1 in Pigment Dispersion Preparation Example A1 was replaced with the aqueous solution of the copolymer A3.

Pigment Dispersion Preparation Example A10

—Preparation of Pigment Dispersion A10—

The pigment dispersion A10 was obtained in the same manner as in Pigment Dispersion Preparation Example A1 except that the aqueous solution of the copolymer A1 in Pigment Dispersion Preparation Example A1 was replaced with the aqueous solution of the copolymer A4.

Pigment Dispersion Preparation Example A11

—Preparation of Pigment Dispersion A11—

The pigment dispersion A11 was obtained in the same manner as in Pigment Dispersion Preparation Example A1 except that the aqueous solution of the copolymer A1 in Pigment Dispersion Preparation Example A1 was replaced with the aqueous solution of the copolymer A5.

Pigment Dispersion Preparation Example A12

—Preparation of Pigment Dispersion A12—

The pigment dispersion A12 was obtained in the same manner as in Pigment Dispersion Preparation Example A1 except that the aqueous solution of the copolymer A1 in Pigment Dispersion Preparation Example A1 was replaced with the aqueous solution of the copolymer A6.

Pigment Dispersion Preparation Example A13

—Preparation of Pigment Dispersion A13—

The pigment dispersion A13 was obtained in the same manner as in Pigment Dispersion Preparation Example A12 except that the carbon black pigment in Pigment Dispersion Preparation Example A12 was replaced with Pigment Blue 15:3.

Pigment Dispersion Preparation Example A14

—Preparation of Pigment Dispersion A14—

The pigment dispersion A14 was obtained in the same manner as in Pigment Dispersion Preparation Example A1 except that the carbon black pigment in Pigment Dispersion Preparation Example A12 was replaced with Pigment Red 122.

Pigment Dispersion Preparation Example A15

—Preparation of Pigment Dispersion A15—

The pigment dispersion A15 was obtained in the same manner as in Pigment Dispersion Preparation Example A12 except that the carbon black pigment in Pigment Dispersion Preparation Example A12 was replaced with Pigment Yellow 74.

Pigment Dispersion Preparation Examples A16 to A28

—Preparation of Pigment Dispersions A16 to A28—

The pigment dispersions A16 to A28 were obtained in the same manner as in Pigment Dispersion Preparation Example A1 except that the aqueous solution of the copolymer A1 in Pigment Dispersion Preparation Example A1 was replaced with the aqueous solution of the copolymers A7 to A19.

Comparative Preparation Example A1

—Preparation of Comparative Pigment Dispersion A1—

The comparative pigment dispersion A1 was obtained in the same manner as in Pigment Dispersion Preparation Example A1 except that in Pigment Dispersion Preparation Example A1, the aqueous solution of the copolymer A1 of Pigment Dispersion Preparation Example A1 was replaced with the aqueous solution of the comparative copolymer A1.

Comparative Preparation Example A2

—Preparation of Comparative Pigment Dispersion A2—

The comparative pigment dispersion A2 was obtained in the same manner as in Pigment Dispersion Preparation Example A3 except that in Pigment Dispersion Preparation Example A3, the aqueous solution of the copolymer A1 of Pigment Dispersion Preparation Example 3 was replaced with the aqueous solution of the comparative copolymer A1.

Comparative Preparation Example A3

—Preparation of Comparative Pigment Dispersion A3—

The comparative pigment dispersion A3 was obtained in the same manner as in Pigment Dispersion Preparation Example A4 except that in Pigment Dispersion Preparation Example A4, the aqueous solution of the copolymer A1 of Pigment Dispersion Preparation Example A4 was replaced with the aqueous solution of the comparative copolymer A1.

Comparative Preparation Example A4

—Preparation of Comparative Pigment Dispersion A4—

The comparative pigment dispersion A4 was obtained in the same manner as in Pigment Dispersion Preparation Example A5 except that in Pigment Dispersion Preparation Example A5, the aqueous solution of the copolymer A1 of Pigment Dispersion Preparation Example A5 was replaced with the aqueous solution of the comparative copolymer A1.

Comparative Preparation Example A5

—Preparation of Comparative Pigment Dispersion A5—

The comparative pigment dispersion A5 was obtained in the same manner as in Comparative Preparation Example A1 except that the aqueous solution of the comparative copolymer A1 of Comparative Preparation Example A1 was replaced with the aqueous solution of the comparative copolymer A2.

Comparative Preparation Example A6

—Preparation of Comparative Pigment Dispersion A6—

The comparative pigment dispersion A6 was obtained in the same manner as in Comparative Preparation Example A1 except that the aqueous solution of the comparative copolymer A1 of Comparative Preparation Example A1 was replaced with the aqueous solution of the comparative copolymer A3.

Comparative Preparation Example A7

—Preparation of Comparative Pigment Dispersion A7—

The comparative pigment dispersion A7 was obtained in the same manner as in Comparative Preparation Example A1 except that the aqueous solution of the comparative copolymer A1 of Comparative Preparation Example A1 was replaced with the aqueous solution of the comparative copolymer A4.

Example A1

—Preparation of Inkjet Recording Ink—

The materials in the following formulation were mixed and stirred for 30 minutes to prepare an inkjet recording ink.
- Pigment dispersion A1 (pigment concentration: 20% by mass) of Pigment Dispersion Preparation Example A1: 44.4 parts by mass
- 1,3-Butanediol: 15 parts by mass
- Glycerin: 20 parts by mass
- 2-Ethyl-1,3-hexanediol: 1 part by mass
- 2,2-Trimethyl-1,3-pentanediol: 1 part by mass
- Polyoxyethylene perfluoroalkyl ether (FS-300, manufactured by Dupont Corp.), component: 40% by mass): 2.5 parts by mass
- Pure water: 16.1 parts by mass

Example A2

—Preparation of Inkjet Recording Ink—

The materials in the following formulation were mixed and stirred for 30 minutes to prepare an inkjet recording ink.
- Pigment dispersion A1 (pigment concentration: 20% by mass) of Pigment Dispersion Preparation Example A1: 44.4 parts by mass
- 1,3-Butanediol: 15 parts by mass
- Glycerin: 20 parts by mass
- 2-Ethyl-1,3-hexanediol: 1 part by mass
- 2,2-Trimethyl-1,3-pentanediol: 1 part by mass
- Polyoxyethylene perfluoroalkyl ether (FS-300, manufactured by Dupont Corp.), component: 40% by mass): 2.5 parts by mass
- Acrylic-silicone resin emulsion (Polysol ROY6312, manufactured by Showa Highpolymer Co., Ltd.): 6 parts by mass
- Pure water: 10.1 parts by mass

Example A3

—Preparation of Inkjet Recording Ink—

The materials in the following formulation were mixed and stirred for 30 minutes to prepare an inkjet recording ink.
- Pigment dispersion A2 (pigment concentration: 20% by mass) of Pigment Dispersion Preparation Example A2: 33.3 parts by mass
- 1,3-Butanediol: 15 parts by mass
- Glycerin: 20 parts by mass
- 2-Ethyl-1,3-hexanediol: 2 part by mass
- Polyoxyethylene perfluoroalkyl ether (FS-300, manufactured by Dupont Corp.), component: 40% by mass): 2.5 parts by mass
- Pure water: 27.2 parts by mass

Example A4

—Preparation of Inkjet Recording Ink—

The materials in the following formulation were mixed and stirred for 30 minutes to prepare an inkjet recording ink.
- Pigment dispersion A3 (pigment concentration: 20% by mass) of Pigment Dispersion Preparation Example A3: 33.3 parts by mass
- 1,3-Butanediol: 15 parts by mass
- Glycerin: 20 parts by mass
- 2-Ethyl-1,3-hexanediol: 2 part by mass
- Polyoxyethylene perfluoroalkyl ether (FS-300, manufactured by Dupont Corp.), component: 40% by mass): 2.5 parts by mass
- Pure water: 27.2 parts by mass

Example A5

—Preparation of Inkjet Recording Ink—

The materials in the following formulation were mixed and stirred for 30 minutes to prepare an inkjet recording ink.
- Pigment dispersion A4 (pigment concentration: 20% by mass) of Pigment Dispersion Preparation Example A4: 33.3 parts by mass
- 1,3-Butanediol: 15 parts by mass
- Glycerin: 20 parts by mass
- 2-Ethyl-1,3-hexanediol: 2 part by mass Polyoxyethylene perfluoroalkyl ether (FS-300, manufactured by Dupont Corp.), component: 40% by mass): 2.5 parts by mass
Pure water: 27.2 parts by mass Examples A6 to A10

—Preparation of Inkjet Recording Inks—

The inkjet recording inks of Examples A6 to A10 were obtained in the same manner as in Examples A1 to A5 except that in Examples A1 to A5, the pigment dispersions A1 to A4 were replaced with the pigment dispersions A5 to A8, respectively.

Examples A11 to A13

—Preparation of Inkjet Recording Inks—

The inkjet recording inks of Examples A11 to A13 were obtained in the same manner as in Example A1 except that in Example A1, the pigment dispersion A1 was replaced with the pigment dispersions A9 to A11.

Examples A14 to A18

—Preparation of Inkjet Recording Inks—

The inkjet recording inks of Examples A14 to A18 were obtained in the same manner as in Examples A1 to A5 except that in Examples A1 to A5, the pigment dispersions A1 to A4 were replaced with the pigment dispersions A12 to A15, respectively.

Examples A19 to A31

—Preparation of Inkjet Recording Inks—

The inkjet recording inks of Examples A19 to A31 were obtained in the same manner as in Example A1 except that in Example A1, the pigment dispersion A1 was replaced with the pigment dispersions A16 to A28.

Comparative Example A1

—Preparation of Inkjet Recording Inks—

The inkjet recording ink of Comparative Examples A1 was obtained in the same manner as in Example A1 except that in Example A1, the pigment dispersion A1 was replaced with the comparative pigment dispersion A1.

Comparative Example A2

—Preparation of Inkjet Recording Inks—

The inkjet recording ink of Comparative Examples A2 was obtained in the same manner as in Example A1 except that in Example A3, the pigment dispersion A1 was replaced with the comparative pigment dispersion A2.

Comparative Example A3

—Preparation of Inkjet Recording Inks—

The inkjet recording ink of Comparative Examples A3 was obtained in the same manner as in Example A4 except that in Example A4, the pigment dispersion A1 was replaced with the comparative pigment dispersion A3.

Comparative Example A4

—Preparation of Inkjet Recording Inks—

The inkjet recording ink of Comparative Example A4 was obtained in the same manner as in Example A5 except that in Example A5, the pigment dispersion A1 was replaced with the comparative pigment dispersion A4.

Comparative Example A5

—Preparation of Inkjet Recording Inks—

The inkjet recording ink of Comparative Example A5 was obtained in the same manner as in Example A1 except that in Example A1, the pigment dispersion A1 was replaced with the comparative pigment dispersion A5.

Comparative Example A6

—Preparation of Inkjet Recording Inks—

The inkjet recording ink of Comparative Example A6 was obtained in the same manner as in Example A1 except that in Example A1, the pigment dispersion A1 was replaced with the comparative pigment dispersion A6.

Comparative Example A7

—Preparation of Inkjet Recording Inks—

The inkjet recording ink of Comparative Example A7 was obtained in the same manner as in Example A1 except that in Example A1, the pigment dispersion A1 was replaced with the comparative pigment dispersion A7.

Next, the contents of Examples are collectively shown in Tables A3-1 to A3-4, and the contents of Comparative Examples are collectively shown in Table A4. The numerical values in Tables A3-1 to A3-3, and Table A4 are given in percent by mass.

TABLE A3-1

|  |  | Examples | | | | | | | |
|---|---|---|---|---|---|---|---|---|---|
|  |  | A1 | A2 | A3 | A4 | A5 | A6 | A7 | A8 |
| Pigment dispersion | Pigment dispersion A1 | 44.4 | 44.4 | — | — | — | — | — | — |
|  | Pigment dispersion A2 | — | — | 33.3 | — | — | — | — | — |
|  | Pigment dispersion A3 | — | — | — | 33.3 | — | — | — | — |
|  | Pigment dispersion A4 | — | — | — | — | 33.3 | — | — | — |
|  | Pigment dispersion A5 | — | — | — | — | — | 44.4 | 44.4 | — |
|  | Pigment dispersion A6 | — | — | — | — | — | — | — | 33.3 |
|  | Pigment dispersion A7 | — | — | — | — | — | — | — | — |
|  | Pigment dispersion A8 | — | — | — | — | — | — | — | — |
|  | Pigment dispersion A9 | — | — | — | — | — | — | — | — |
|  | Pigment dispersion A10 | — | — | — | — | — | — | — | — |
|  | Pigment dispersion A11 | — | — | — | — | — | — | — | — |
|  | Pigment dispersion A12 | — | — | — | — | — | — | — | — |
|  | Pigment dispersion A13 | — | — | — | — | — | — | — | — |
|  | Pigment dispersion A14 | — | — | — | — | — | — | — | — |

TABLE A3-1-continued

|  |  | Examples | | | | | | | |
|---|---|---|---|---|---|---|---|---|---|
|  |  | A1 | A2 | A3 | A4 | A5 | A6 | A7 | A8 |
|  | Pigment dispersion A15 | — | — | — | — | — | — | — | — |
|  | Pigment dispersion A16 | — | — | — | — | — | — | — | — |
|  | Pigment dispersion A17 | — | — | — | — | — | — | — | — |
|  | Pigment dispersion A18 | — | — | — | — | — | — | — | — |
|  | Pigment dispersion A19 | — | — | — | — | — | — | — | — |
|  | Pigment dispersion A20 | — | — | — | — | — | — | — | — |
|  | Pigment dispersion A21 | — | — | — | — | — | — | — | — |
|  | Pigment dispersion A22 | — | — | — | — | — | — | — | — |
|  | Pigment dispersion A23 | — | — | — | — | — | — | — | — |
|  | Pigment dispersion A24 | — | — | — | — | — | — | — | — |
|  | Pigment dispersion A25 | — | — | — | — | — | — | — | — |
|  | Pigment dispersion A26 | — | — | — | — | — | — | — | — |
|  | Pigment dispersion A27 | — | — | — | — | — | — | — | — |
|  | Pigment dispersion A28 | — | — | — | — | — | — | — | — |
| Water-soluble solvents | 1,3-Butanediol | 15 | 15 | 15 | 15 | 15 | 15 | 15 | 15 |
|  | Glycerin | 20 | 20 | 20 | 20 | 20 | 20 | 20 | 20 |
| Penetrating agents | 2-Ethyl-1,3-hexanediol | 1 | 1 | 2 | 2 | 2 | 1 | 1 | 2 |
|  | 2,2-Trimethyl-1,3-pentanediol | 1 | 1 | 0 | 0 | 0 | 1 | 1 | 0 |
| Surfactant | FS-300 | 2.5 | 2.5 | 2.5 | 2.5 | 2.5 | 2.5 | 2.5 | 2.5 |
| Water-dispersible resin | Acrylic-silicone resin emulsion | 0 | 6 | 0 | 0 | 0 | 0 | 6 | 0 |
| Pure water |  | 16.1 | 10.1 | 27.2 | 27.2 | 27.2 | 16.1 | 10.1 | 27.2 |
| Total (% by mass) |  | 100 | 100 | 100 | 100 | 100 | 100 | 100 | 100 |

TABLE A3-2

|  |  | Examples | | | | | | | |
|---|---|---|---|---|---|---|---|---|---|
|  |  | A9 | A10 | A11 | A12 | A13 | A14 | A15 | A16 |
| Pigment dispersion | Pigment dispersion A1 | — | — | — | — | — | — | — | — |
|  | Pigment dispersion A2 | — | — | — | — | — | — | — | — |
|  | Pigment dispersion A3 | — | — | — | — | — | — | — | — |
|  | Pigment dispersion A4 | — | — | — | — | — | — | — | — |
|  | Pigment dispersion A5 | — | — | — | — | — | — | — | — |
|  | Pigment dispersion A6 | — | — | — | — | — | — | — | — |
|  | Pigment dispersion A7 | 33.3 | — | — | — | — | — | — | — |
|  | Pigment dispersion A8 | — | 33.3 | — | — | — | — | — | — |
|  | Pigment dispersion A9 | — | — | 44.4 | — | — | — | — | — |
|  | Pigment dispersion A10 | — | — | — | 44.4 | — | — | — | — |
|  | Pigment dispersion A11 | — | — | — | — | 44.4 | — | — | — |
|  | Pigment dispersion A12 | — | — | — | — | — | 44.4 | 44.4 | — |
|  | Pigment dispersion A13 | — | — | — | — | — | — | — | 33.3 |
|  | Pigment dispersion A14 | — | — | — | — | — | — | — | — |
|  | Pigment dispersion A15 | — | — | — | — | — | — | — | — |
|  | Pigment dispersion A16 | — | — | — | — | — | — | — | — |
|  | Pigment dispersion A17 | — | — | — | — | — | — | — | — |
|  | Pigment dispersion A18 | — | — | — | — | — | — | — | — |
|  | Pigment dispersion A19 | — | — | — | — | — | — | — | — |
|  | Pigment dispersion A20 | — | — | — | — | — | — | — | — |
|  | Pigment dispersion A21 | — | — | — | — | — | — | — | — |
|  | Pigment dispersion A22 | — | — | — | — | — | — | — | — |
|  | Pigment dispersion A23 | — | — | — | — | — | — | — | — |
|  | Pigment dispersion A24 | — | — | — | — | — | — | — | — |
|  | Pigment dispersion A25 | — | — | — | — | — | — | — | — |
|  | Pigment dispersion A26 | — | — | — | — | — | — | — | — |
|  | Pigment dispersion A27 | — | — | — | — | — | — | — | — |
|  | Pigment dispersion A28 | — | — | — | — | — | — | — | — |
| Water-soluble solvents | 1,3-Butanediol | 15 | 15 | 15 | 15 | 15 | 15 | 15 | 15 |
|  | Glycerin | 20 | 20 | 20 | 20 | 20 | 20 | 20 | 20 |
| Penetrating agents | 2-Ethyl-1,3-hexanediol | 2 | 2 | 1 | 1 | 1 | 1 | 1 | 2 |
|  | 2,2-Trimethyl-1,3-pentanediol | 0 | 0 | 1 | 1 | 1 | 1 | 1 | 0 |

TABLE A3-2-continued

|  |  | Examples | | | | | | | |
|---|---|---|---|---|---|---|---|---|---|
|  |  | A9 | A10 | A11 | A12 | A13 | A14 | A15 | A16 |
| Surfactant | FS-300 | 2.5 | 2.5 | 2.5 | 2.5 | 2.5 | 2.5 | 2.5 | 2.5 |
| Water-dispersible resin | Acrylic-silicone resin emulsion | 0 | 0 | 0 | 0 | 0 | 0 | 6 | 0 |
| Pure water |  | 27.2 | 27.2 | 16.1 | 16.1 | 16.1 | 16.1 | 10.1 | 27.2 |
| Total (% by mass) |  | 100 | 100 | 100 | 100 | 100 | 100 | 100 | 100 |

TABLE A3-3

|  |  | Examples | | | | | | | |
|---|---|---|---|---|---|---|---|---|---|
|  |  | A17 | A18 | A19 | A20 | A21 | A22 | A23 | A24 |
| Pigment dispersion | Pigment dispersion A1 | — | — | — | — | — | — | — | — |
|  | Pigment dispersion A2 | — | — | — | — | — | — | — | — |
|  | Pigment dispersion A3 | — | — | — | — | — | — | — | — |
|  | Pigment dispersion A4 | — | — | — | — | — | — | — | — |
|  | Pigment dispersion A5 | — | — | — | — | — | — | — | — |
|  | Pigment dispersion A6 | — | — | — | — | — | — | — | — |
|  | Pigment dispersion A7 | — | — | — | — | — | — | — | — |
|  | Pigment dispersion A8 | — | — | — | — | — | — | — | — |
|  | Pigment dispersion A9 | — | — | — | — | — | — | — | — |
|  | Pigment dispersion A10 | — | — | — | — | — | — | — | — |
|  | Pigment dispersion A11 | — | — | — | — | — | — | — | — |
|  | Pigment dispersion A12 | — | — | — | — | — | — | — | — |
|  | Pigment dispersion A13 | — | — | — | — | — | — | — | — |
|  | Pigment dispersion A14 | 33.3 | — | — | — | — | — | — | — |
|  | Pigment dispersion A15 | — | 33.3 | — | — | — | — | — | — |
|  | Pigment dispersion A16 | — | — | 44.4 | — | — | — | — | — |
|  | Pigment dispersion A17 | — | — | — | 44.4 | — | — | — | — |
|  | Pigment dispersion A18 | — | — | — | — | 44.4 | — | — | — |
|  | Pigment dispersion A19 | — | — | — | — | — | 44.4 | — | — |
|  | Pigment dispersion A20 | — | — | — | — | — | — | 44.4 | — |
|  | Pigment dispersion A21 | — | — | — | — | — | — | — | 44.4 |
|  | Pigment dispersion A22 | — | — | — | — | — | — | — | — |
|  | Pigment dispersion A23 | — | — | — | — | — | — | — | — |
|  | Pigment dispersion A24 | — | — | — | — | — | — | — | — |
|  | Pigment dispersion A25 | — | — | — | — | — | — | — | — |
|  | Pigment dispersion A26 | — | — | — | — | — | — | — | — |
|  | Pigment dispersion A27 | — | — | — | — | — | — | — | — |
|  | Pigment dispersion A28 | — | — | — | — | — | — | — | — |
| Water-soluble solvents | 1,3-Butanediol | 15 | 15 | 15 | 15 | 15 | 15 | 15 | 15 |
|  | Glycerin | 20 | 20 | 20 | 20 | 20 | 20 | 20 | 20 |
| Penetrating agents | 2-Ethyl-1,3-hexanediol | 2 | 2 | 1 | 1 | 1 | 1 | 1 | 1 |
|  | 2,2-Trimethyl-1,3-pentanediol | 0 | 0 | 1 | 1 | 1 | 1 | 1 | 1 |
| Surfactant | FS-300 | 2.5 | 2.5 | 2.5 | 2.5 | 2.5 | 2.5 | 2.5 | 2.5 |
| Water-dispersible resin | Acrylic-silicone resin emulsion | 0 | 0 | 0 | 0 | 0 | 0 | 0 | 0 |
| Pure water |  | 27.2 | 27.2 | 16.1 | 16.1 | 16.1 | 16.1 | 16.1 | 16.1 |
| Total (% by mass) |  | 100 | 100 | 100 | 100 | 100 | 100 | 100 | 100 |

TABLE A3-4

|  |  | Examples | | | | | | |
|---|---|---|---|---|---|---|---|---|
|  |  | A25 | A26 | A27 | A28 | A29 | A30 | A31 |
| Pigment dispersion | Pigment dispersion A1 | — | — | — | — | — | — | — |
|  | Pigment dispersion A2 | — | — | — | — | — | — | — |
|  | Pigment dispersion A3 | — | — | — | — | — | — | — |
|  | Pigment dispersion A4 | — | — | — | — | — | — | — |
|  | Pigment dispersion A5 | — | — | — | — | — | — | — |

TABLE A3-4-continued

|  |  | Examples |  |  |  |  |  |  |
|---|---|---|---|---|---|---|---|---|
|  |  | A25 | A26 | A27 | A28 | A29 | A30 | A31 |
|  | Pigment dispersion A6 | — | — | — | — | — | — | — |
|  | Pigment dispersion A7 | — | — | — | — | — | — | — |
|  | Pigment dispersion A8 | — | — | — | — | — | — | — |
|  | Pigment dispersion A9 | — | — | — | — | — | — | — |
|  | Pigment dispersion A10 | — | — | — | — | — | — | — |
|  | Pigment dispersion A11 | — | — | — | — | — | — | — |
|  | Pigment dispersion A12 | — | — | — | — | — | — | — |
|  | Pigment dispersion A13 | — | — | — | — | — | — | — |
|  | Pigment dispersion A14 | — | — | — | — | — | — | — |
|  | Pigment dispersion A15 | — | — | — | — | — | — | — |
|  | Pigment dispersion A16 | — | — | — | — | — | — | — |
|  | Pigment dispersion A17 | — | — | — | — | — | — | — |
|  | Pigment dispersion A18 | — | — | — | — | — | — | — |
|  | Pigment dispersion A19 | — | — | — | — | — | — | — |
|  | Pigment dispersion A20 | — | — | — | — | — | — | — |
|  | Pigment dispersion A21 | — | — | — | — | — | — | — |
|  | Pigment dispersion A22 | 44.4 | — | — | — | — | — | — |
|  | Pigment dispersion A23 | — | 44.4 | — | — | — | — | — |
|  | Pigment dispersion A24 | — | — | 44.4 | — | — | — | — |
|  | Pigment dispersion A25 | — | — | — | 44.4 | — | — | — |
|  | Pigment dispersion A26 | — | — | — | — | 44.4 | — | — |
|  | Pigment dispersion A27 | — | — | — | — | — | 44.4 | — |
|  | Pigment dispersion A28 | — | — | — | — | — | — | 44.4 |
| Water-soluble solvents | 1,3-Butanediol | 15 | 15 | 15 | 15 | 15 | 15 | 15 |
|  | Glycerin | 20 | 20 | 20 | 20 | 20 | 20 | 20 |
| Penetrating agents | 2-Ethyl-1,3-hexanediol | 1 | 1 | 1 | 1 | 1 | 1 | 1 |
|  | 2,2-Trimethyl-1,3-pentanediol | 1 | 1 | 1 | 1 | 1 | 1 | 1 |
| Surfactant | FS-300 | 2.5 | 2.5 | 2.5 | 2.5 | 2.5 | 2.5 | 2.5 |
| Water-dispersible resin | Acrylic-silicone resin emulsion | 0 | 0 | 0 | 0 | 0 | 0 | 0 |
| Pure water |  | 16.1 | 16.1 | 16.1 | 16.1 | 16.1 | 16.1 | 16.1 |
| Total (% by mass) |  | 100 | 100 | 100 | 100 | 100 | 100 | 100 |

TABLE A4

|  |  | Comparative Examples |  |  |  |  |  |  |
|---|---|---|---|---|---|---|---|---|
|  |  | A1 | A2 | A3 | A4 | A5 | A6 | A7 |
| Pigment dispersion | Comparative Pigment dispersion A1 | 44.4 | — | — | — | — | — | — |
|  | Comparative Pigment dispersion A2 | — | 33.3 | — | — | — | — | — |
|  | Comparative Pigment dispersion A3 | — | — | 33.3 | — | — | — | — |
|  | Comparative Pigment dispersion A4 | — | — | — | 33.3 | — | — | — |
|  | Comparative Pigment dispersion A5 | — | — | — | — | 44.4 | — | — |
|  | Comparative Pigment dispersion A6 | — | — | — | — | — | 44.4 | — |
|  | Comparative Pigment dispersion A7 | — | — | — | — | — | — | 44.4 |
| Water-soluble solvents | 1,3-Butanediol | 15 | 15 | 15 | 15 | 15 | 15 | 15 |
|  | Glycerin | 20 | 20 | 20 | 20 | 20 | 20 | 20 |
| Penetrating agents | 2-Ethyl-1,3-hexanediol | 1 | 2 | 2 | 2 | 1 | 1 | 1 |
|  | 2,2-Trimethyl-1,3-pentanediol | 1 | 0 | 0 | 0 | 1 | 1 | 1 |
| Surfactant | FS-300 | 2.5 | 2.5 | 2.5 | 2.5 | 2.5 | 2.5 | 2.5 |
| Water-dispersible resin | Acrylic-silicone resin emulsion | 0 | 0 | 0 | 0 | 0 | 0 | 0 |
| Pure water |  | 16.1 | 27.2 | 27.2 | 27.2 | 16.1 | 16.1 | 16.1 |
| Total (% by mass) |  | 100 | 100 | 100 | 100 | 100 | 100 | 100 |

Next, on the basis of the following evaluation methods, the inlet recording inks of Examples 1 to 26, Comparative Examples 1 to 7, Examples A1 to A31 and Comparative Examples A1 to A7. The results thus obtained are shown in Tables 5 and 6 and Tables A5 and A.

<Image Density>

In an environment of 23° C. and 50% RH, the respective prepared inks were filled in an inkjet printer (IPSiO GX5000, manufactured by Ricoh Co., Ltd.), a chart prepared by using Microsoft Word 2000 (product of Microsoft Corp.) on which 64 point black squares were written was printed on a sheet of My Paper (manufactured by Ricoh Co., Ltd.) by using the inkjet printer, and then the image densities were evaluated by measuring the colors of the black squares on the printing surface by using X-Rite 938. In this case, the printing mode used was the "no color correction" mode set as modification from the "plain paper-standard, fast" mode by using the user mode setting function for plain paper with the aid of the attached driver. The evaluations of the image densities of the respective colors were performed on the basis of the following evaluation standards.

[Evaluation Standards]
A: black: 1.25 or more,
magenta: 1.00 or more,
cyan: 1.00 or more, or
yellow: 0.85 or more
B: black: 1.2 or more,
magenta: 0.95 or more,
cyan: 0.95 or more, or
yellow: 0.8 or more
C: black: 1.15 or more,
magenta: 0.9 or more,
cyan: 0.9 or more, or
yellow: 0.75 or more
D: black: 1.10 or more,
magenta: 0.85 or more,
cyan: 0.85 or more, or
yellow: 0.7 or more
E: black: less than 1.10,
magenta: less than 0.85,
cyan: less than 0.85, or
yellow: less than 0.70

<Ink Storage Stability>

Each of the inks was filled in an ink cartridges, and stored at 60° C. for 2 weeks, and the variation rate of the viscosity after the storage in relation to the viscosity before the storage was evaluated on the basis of the following standards. The viscosity of the ink was measured at 25° C. with a viscometer RE80L manufactured by Told Sangyo Co., Ltd.

[Evaluation Standards]
A: The variation rate of the viscosity is less than ±3%.
B: The variation rate of the viscosity is ±3% or more and less than ±6%.
C: The variation rate of the viscosity is ±6% or more and less than ±10%.
D: The variation rate of the viscosity is ±10% or more and less than ±20%.
E: The variation rate of the viscosity is 20% or more.

<Ink Ejection Stability>

For the evaluation of the ejection stability, after printed matter was printed, the inkjet printer was allowed to stand with the recording heads being capped in an environment of 50° C. for 1 month. Whether or not the ejection state of the printer after being allowed to stand was recovered to the initial ejection state was evaluated according to the following evaluation standards in terms of the following number of the cleaning operations.

[Evaluation Standards]
A: Printing is possible without cleaning.
B: The initial ejection state is recovered by one to three times of cleaning.
C: The initial ejection state is recovered by our to five times of cleaning.
D: The initial ejection state is recovered by six to 10 times of cleaning.
E: The initial ejection state is not found to be recovered even by 10 or more times of cleaning.

TABLE 5

| Ink | Pigment dispersions | Copolymer | Image density | Storage stability | Ejection stability |
|---|---|---|---|---|---|
| Example 1 | Pigment dispersion 1 | Copolymer 1 | B | B | B |
| Example 2 | Pigment dispersion 1 | | B | B | B |
| Example 3 | Pigment dispersion 2 | | B | B | B |
| Example 4 | Pigment dispersion 3 | | B | B | B |
| Example 5 | Pigment dispersion 4 | | B | B | B |
| Example 6 | Pigment dispersion 5 | Copolymer 2 | B | B | B |
| Example 7 | Pigment dispersion 6 | Copolymer 3 | B | B | B |
| Example 8 | Pigment dispersion 7 | Copolymer 4 | B | A | A |
| Example 9 | Pigment dispersion 8 | Copolymer 5 | B | B | B |
| Example 10 | Pigment dispersion 8 | | B | B | B |
| Example 11 | Pigment dispersion 9 | | B | B | B |
| Example 12 | Pigment dispersion 10 | | B | B | B |
| Example 13 | Pigment dispersion 11 | | B | B | B |
| Example 14 | Pigment dispersion 12 | Copolymer 6 | D | B | A |
| Example 15 | Pigment dispersion 13 | Copolymer 7 | D | C | C |
| Example 16 | Pigment dispersion 14 | Copolymer 8 | B | B | B |
| Example 17 | Pigment dispersion 15 | Copolymer 9 | B | C | C |
| Example 18 | Pigment dispersion 16 | Copolymer 10 | D | B | B |
| Example 19 | Pigment dispersion 17 | Copolymer 11 | B | D | B |
| Example 20 | Pigment dispersion 18 | Copolymer 12 | B | D | B |
| Example 21 | Pigment dispersion 19 | Copolymer 13 | A | D | D |
| Example 22 | Pigment dispersion 20 | Copolymer 14 | D | D | B |
| Example 23 | Pigment dispersion 21 | Copolymer 15 | D | D | B |
| Example 24 | Pigment dispersion 22 | Copolymer 16 | D | D | D |
| Example 25 | Pigment dispersion 23 | Copolymer 17 | A | D | D |
| Example 26 | Pigment dispersion 24 | Copolymer 18 | B | A | A |

TABLE 6

| Ink | Pigment dispersions | Copolymer | Image density | Storage stability | Ejection stability |
|---|---|---|---|---|---|
| Comparative Example 1 | Comparative pigment dispersion 1 | Copolymer 1 | E | D | D |
| Comparative Example 2 | Comparative pigment dispersion 2 | | E | D | D |
| Comparative Example 3 | Comparative pigment dispersion 3 | | E | D | D |
| Comparative Example 4 | Comparative pigment dispersion 4 | | E | D | D |
| Comparative Example 5 | Comparative pigment dispersion 5 | Comparative Copolymer 2 | D | E | E |
| Comparative Example 6 | Comparative pigment dispersion 6 | Comparative Copolymer 3 | E | A | D |
| Comparative Example 7 | Comparative pigment dispersion 7 | Comparative Copolymer 4 | D | D | D |

From the results of Tables 5 and 6, any of the inkjet recording inks of the present invention, including the phosphate group-containing copolymer including the structural unit represented by the general formula (1) and the structural unit represented by the general formula (2) is excellent in image density and ink storage stability, and free from any properties to cause problems in practical use.

From a comparison of Examples 1 to 26 with Comparative Examples 1 to 7, it has been found that the inkjet recording inks of the present invention axe high in image density and are equivalent to or higher in ink storage stability than the inkjet recording inks of these Comparative Examples.

Moreover, from a mutual comparison between Examples, the following are found.

From a comparison of Examples 1 and 6 with Comparative Example 7, the neutralization rate of 50% or more with a neutralizing salt in the structural unit represented by the general formula (1) has been found to provide effects.

From a comparison between Examples 1 and 7, it has been found that even when $R^2$ in the structural unit represented by the general formula (2) is either of a methyl group and a hydrogen atom, the same effects are obtained.

From a comparison between Examples 1, 8 and 26, it has been found that independent of the type of the neutralizing salt in the structural unit represented by the general formula (1), the same effects are obtained.

From a comparison of Examples 1 to 5 with Examples 9 to 13, it has been found that even when $R^1$ in the structural unit represented by the general formula (1) is either of a methyl group and a hydrogen atom, the same effects are obtained.

From Examples 14 to 17, it has been found that even when the ratio between the structural unit represented by the general formula (1) and the structural unit represented by the general formula (2) is varied, the same effects are obtained.

From a comparison of Examples 1 to 17 and 26 with Examples 18 to 21, it has been found that the when the viscosity of the 10% by mass aqueous solution of the phosphate group-containing copolymer falls within a range from 4.0 mPa·s to 30.0 mPa·s at 25° C., the inkjet recording ink is excellent both in image density and in ink storage stability.

From a comparison of Examples 18 to 21 with Examples 22 to 25, it has been found that when the proportion of the structural unit represented by the general formula (1) falls within a range from 10% by mass to 60% by mass, the inkjet recording ink is excellent both in image density and in ink storage stability.

From Examples 1 to 5 and 9 to 13, it has been found that effects are obtained in a manner independent of the color of the pigment.

From Examples 1 and 2 and Examples 9 and 10, it has been found that to effects are obtained in a manner independent of the ink formulation.

TABLE A5

| Ink | Pigment dispersion | Copolymer | Image density | Storage stability | Ejection stability |
|---|---|---|---|---|---|
| Example A1 | Pigment dispersion A1 | Copolymer A1 | A | A | A |
| Example A2 | Pigment dispersion A1 | | A | A | A |
| Example A3 | Pigment dispersion A2 | | A | A | A |
| Example A4 | Pigment dispersion A3 | | A | A | A |
| Example A5 | Pigment dispersion A4 | | A | A | A |
| Example A6 | Pigment dispersion A5 | Copolymer A2 | A | A | A |
| Example A7 | Pigment dispersion A5 | | A | A | A |
| Example A8 | Pigment dispersion A6 | | A | A | A |
| Example A9 | Pigment dispersion A7 | | A | A | A |
| Example A10 | Pigment dispersion A8 | | A | A | A |
| Example A11 | Pigment dispersion A9 | Copolymer A3 | A | A | A |
| Example A12 | Pigment dispersion A10 | Copolymer A4 | A | A | A |
| Example A13 | Pigment dispersion A11 | Copolymer A5 | A | A | A |
| Example A14 | Pigment dispersion A12 | Copolymer A6 | A | A | A |
| Example A15 | Pigment dispersion A12 | | A | A | A |
| Example A16 | Pigment dispersion A13 | | A | A | A |
| Example A17 | Pigment dispersion A14 | | A | A | A |
| Example A18 | Pigment dispersion A15 | | A | A | A |
| Example A19 | Pigment dispersion A16 | Copolymer A7 | B | A | B |
| Example 20 | Pigment dispersion A17 | Copolymer A8 | B | B | C |
| Example A21 | Pigment dispersion A18 | Copolymer A9 | B | B | B |
| Example A22 | Pigment dispersion A19 | Copolymer A10 | A | B | C |
| Example A23 | Pigment dispersion A20 | Copolymer A11 | C | B | B |
| Example A24 | Pigment dispersion A21 | Copolymer A12 | C | C | D |
| Example A25 | Pigment dispersion A22 | Copolymer A13 | B | B | C |
| Example A26 | Pigment dispersion A23 | Copolymer A14 | A | C | D |
| Example A27 | Pigment dispersion A24 | Copolymer A15 | D | B | C |
| Example A28 | Pigment dispersion A25 | Copolymer A16 | D | C | D |
| Example A29 | Pigment dispersion A26 | Copolymer A17 | B | D | D |
| Example A30 | Pigment dispersion A27 | Copolymer A18 | B | D | D |

TABLE A5-continued

| Ink | Pigment dispersion | Copolymer | Image density | Storage stability | Ejection stability |
|---|---|---|---|---|---|
| Example A31 | Pigment dispersion A28 | Copolymer A19 | A | A | A |

TABLE A6

| Ink | Pigment dispersion | Copolymer | Image density | Storage stability | Ejection stability |
|---|---|---|---|---|---|
| Comparative Example A1 | Comparative pigment dispersion A1 | Comparative Copolymer A1 | E | D | D |
| Comparative Example A2 | Comparative pigment dispersion A2 | | E | D | D |
| Comparative Example A3 | Comparative pigment dispersion A3 | | E | D | D |
| Comparative Example A4 | Comparative pigment dispersion A4 | | E | D | D |
| Comparative Example A5 | Comparative pigment dispersion A5 | Comparative Copolymer A2 | D | E | E |
| Comparative Example A6 | Comparative pigment dispersion A6 | Comparative Copolymer A3 | E | A | D |
| Comparative Example A7 | Comparative pigment dispersion A7 | Comparative Copolymer A4 | D | D | D |

From the results of Tables A5 and A6, any of the inkjet recording inks of the present invention, including the phosphate group-containing copolymer including the structural unit represented by the general formula (1), the structural unit represented by the general formula (2) and the structural unit represented by at least either of the general formula (3) and the general formula (4) is excellent in image density, ink storage stability and ink ejection stability, and free from any properties to cause problems in practical use.

From a comparison of Examples A1 to A31 with Comparative Examples A1 to A7, it has been found that the inkjet recording inks of the present invention are high in image density and are equivalent to or higher in ink storage stability and in ink ejection stability than the inkjet recording inks of these Comparative Examples.

Moreover, from a mutual comparison between Examples, the following are found.

From a comparison of Examples A1 to A5 with Examples A6 to A10, it has been found that even the structural unit represented by at least either of the general formula (3) and the general formula (4) provides the same effects.

From a comparison of Examples A1 and A11 with Comparative Examples A7, the neutralization rate of 50% or more with a neutralizing salt in the structural unit represented by the general formula (1) has been found to provide effects.

From a comparison between Examples A1 and A12, it has been found that even when $R^2$ and $R^3$ in the structural units represented by the general formula (2) and the general formula (3) are each either of a methyl group and a hydrogen atom, the same effects are obtained.

From a comparison between Examples A1 and A13, it has been found that independent of the type of the neutralizing salt in the structural unit represented by the general formula (1), the same effects are obtained.

From a comparison of Examples A1 to A5 with Examples A14 to A18, it has been found that even when $R^1$ in the structural unit represented by the general formula (1) is either of a methyl group and a hydrogen atom, the same effects are obtained.

From Examples A19 to A22, it has been found that even when the ratios between the structural unit represented by the general formula (1), the structural unit represented by the general formula (2) and the structural unit represented by at least either of the general formula (3) and the general formula (4), the same effects are obtained.

From a comparison of Examples A1 to A22 and A31 with Examples A23 to A26, it has been found that the when the viscosity of the 10% by mass aqueous solution of the phosphate group-containing copolymer falls within a range from 4.0 mPa·s to 30.0 mPa·s, the inkjet recording ink is excellent in any of the image density, ink storage stability and ink ejection stability.

From a comparison of Examples A23 to A26 with Examples A27 to A30, it has been found that when the proportion of the structural unit represented by the general formula (1) falls within a range from 10% by mass to 60% by mass, the inkjet recording ink is excellent in any of the image density, ink storage stability and ink ejection stability.

From Examples A1 to A5, A6 to A10, and A14 to A18, it has been found that effects are obtained in a manner independent of the color of the pigment.

From Examples A1 and A2, A6 and A7, and A14 and A15, it has been found that effects are obtained in a manner independent of the ink formulation From the above-described results, the inkjet recording ink of the present invention has been found to be obviously excellent in image density with respect to each of the color inks, due to the aggregation effect ascribable to the reaction with the multivalent metal ion (in particular, calcium ion) contained in plain paper, and equivalent to or more than conventional inkjet recording inks in ink storage stability. The inkjet recording apparatus of the present invention is satisfactory in ink storage stability, and additionally, satisfactory in drying property, provides high image density on plain paper and coated printing paper, and thus can be applied to various types of recording systems based on the inkjet recording method. Specifically, the ink recorded matter of the present invention are high in image quality and free from blur and excellent in temporal stability, and can be suitably used for various purposes as various printed and image recording materials. The recording apparatus based on the inkjet recording method can be applied to, for example, inkjet recording printers, facsimile machines, copiers, and printer/fax/copier multifunction peripherals.

The aspects of the present invention are, for example, as follows.

<1> An inkjet recording ink, including:
water;
a water-soluble solvent;
a pigment; and
a phosphate group-containing copolymer, wherein the phosphate group-containing copolymer includes a structural unit represented by the following general formula (1) and a structural unit represented by the following general formula (2):

General formula (1)

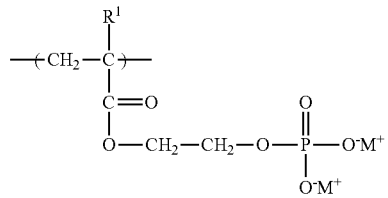

wherein, in the general formula (1). $R^1$ represents either of a hydrogen atom and a methyl group; and $M^+$ represents any of an alkali metal ion, an organic amine ion and a hydrogen ion, one-half or more of the $M^+$ in the copolymer is an alkali metal ion or an organic amine, and the remainder is a hydrogen ion;

General formula (2)

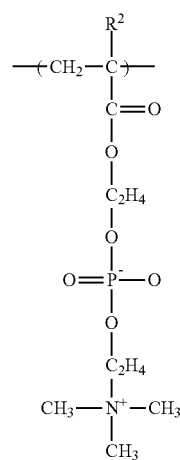

wherein, in the general formula (2), $R^2$ represents either of a hydrogen atom and a methyl group.

<2> The inkjet recording ink according to <1>, wherein the phosphate group-containing copolymer further includes a structural unit represented by at least either of the following general formula (3) and the following general formula (4):

General formula (3)

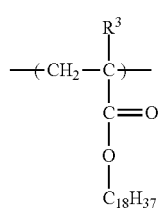

wherein, in the general formula (3), $R^3$ represents either of a hydrogen atom and a methyl group;

General formula (4)

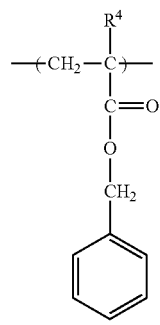

wherein, in the general formula (4), $R^4$ represents either of a hydrogen atom and a methyl group.

<3> The inkjet recording ink according to <1> or <2>, wherein a content of the structural unit represented by the general formula (1) in the phosphate group-containing copolymer is 10% by mass to 60% by mass.

<4> The inkjet recording ink according to any one of <1> to <3>, wherein a viscosity of a 10% by mass aqueous solution of the phosphate group-containing copolymer is 2.5 mPa·s to 35.0 mPa·s at 25° C.

<5> The inkjet recording ink according to any one of <1> to <4>, wherein the phosphate group-containing copolymer is a polymerization product formed between a monomer represented by the following general formula (5) and a monomer represented by the following general formula (6):

General formula (5)

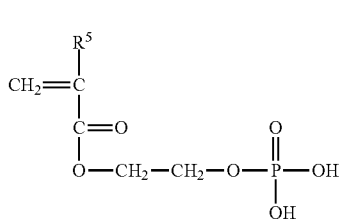

wherein, in the general formula (5), $R^5$ represents either of a hydrogen atom and a methyl group;

General formula (6)

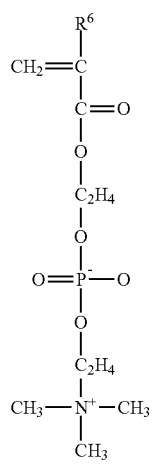

wherein, in the general formula (6), $R^6$ represents either of a hydrogen atom and a methyl group.

<6> The inkjet recording ink according to <5>, wherein the phosphate group-containing copolymer is the polymerization product formed by further polymerizing a monomer represented by at least either of the following general formula (7) and the following general formula (8):

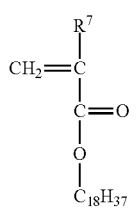

General formula (7)

wherein, in the general formula (7), $R^7$ represents either of a hydrogen atom and a methyl group;

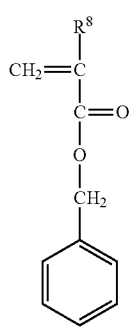

General formula (8)

wherein, in the general formula (8), $R^8$ represents either of a hydrogen atom and a methyl group.

<7> An ink cartridge, including:
a vessel; and
the inkjet recording ink according to any one of <1> to <6> housed in the vessel.

<8> An inkjet recording method, including:
recording an image by applying a stimulus to the inkjet recording ink according to any one of <1> to <6> to allow the inkjet recording ink to fly.

<9> An inkjet recording apparatus, including:
the inkjet recording ink according to any one of <1> to <6>; and
an ink flying unit configured to record an image by applying a stimulus to the inkjet recording ink to allow the inkjet recording ink to fly.

<10> An ink recorded matter, including:
a recording medium; and
an image on the recording medium,
wherein the image is recorded on the recording medium with the inkjet recording ink according to any one of <1> to <6>.

This application claims priority to Japanese application No. 2013-051457, filed on Mar. 14, 2013 and Japanese application No. 2013-061460, filed on Mar. 14, 2013, and incorporated herein by reference.

What is claimed is:
1. An inkjet recording ink, comprising:
water;
a water-soluble solvent;
a pigment; and
a phosphate group-containing copolymer,
wherein the phosphate group-containing copolymer comprises a structural unit represented by the following general formula (1), a structural unit represented by the following general formula (2), and a structural unit represented by the following general formula (4):

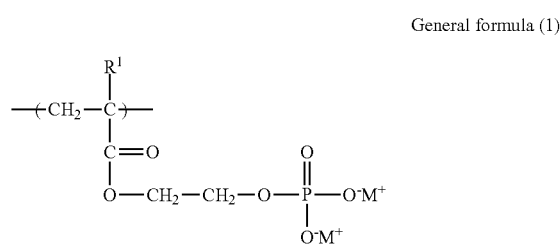

General formula (1)

wherein, in the general formula (1), $R^1$ represents either of a hydrogen atom and a methyl group; and $M^+$ represents an alkali metal ion, an organic amine ion or a hydrogen ion, one-half or more of the $M^+$ in the copolymer is an alkali metal ion or an organic amine ion, and the remainder is a hydrogen ion;

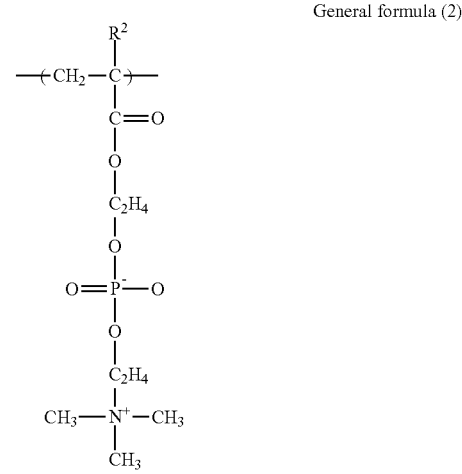

General formula (2)

wherein, in the general formula (2), $R^2$ represents either of a hydrogen atom and a methyl group; and

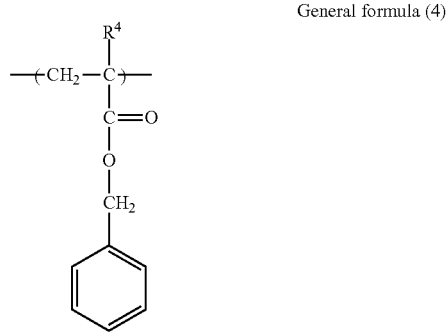

General formula (4)

wherein in the general formula (4), $R^4$ represents either of a hydrogen atom and a methyl group.

2. The inkjet recording ink according to claim 1, wherein a content of the structural unit represented by the general formula (1) in the phosphate group-containing copolymer is 10% by mass to 60% by mass.

3. The inkjet recording ink according to claim 1, wherein a viscosity of a 10% by mass aqueous solution of the phosphate group-containing copolymer is 2.5 mPa·s to 35.0 mPa·s at 25° C.

4. An ink cartridge, comprising:

a vessel; and an inkjet recording ink housed in the vessel, wherein the inkjet recording ink comprises:

water;

a water-soluble solvent;

a pigment; and a phosphate group-containing copolymer, wherein the phosphate group-containing copolymer comprises a structural unit represented by the following general formula (1), a structural unit represented by the following general formula (2), and a structural unit represented by the following general formula (4):

General formula (1)

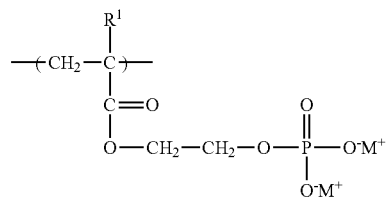

wherein, in the general formula (1), $R^1$ represents either of a hydrogen atom and a methyl group; and $M^+$ represents an alkali metal ion, an organic amine ion or a hydrogen ion, one-half or more of the $M^+$ in the copolymer is an alkali metal ion or an organic amine ion, and the remainder is a hydrogen ion, General formula (2)

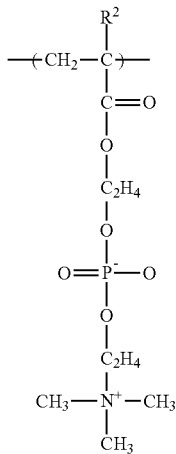

wherein, in the general formula (2), $R^2$ represents either of a hydrogen atom and a methyl group; and General formula (4)

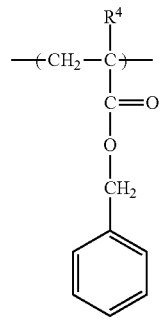

wherein, in the general formula (4), $R^4$ represents either of a hydrogen atom and a methyl group.

5. An inkjet recording apparatus, comprising:

an inkjet recording ink; and an ink flying unit configured to record an image by applying a stimulus to the inkjet recording ink to allow the inkjet recording ink to fly, wherein the inkjet recording ink comprises:

water;

a water-soluble solvent;

a pigment; and a phosphate group-containing copolymer, wherein the phosphate group-containing copolymer comprises a structural unit represented by the following general formula (1) and a structural unit represented by the following general formula (2), and wherein the phosphate group-containing copolymer further comprises a structural unit represented by the following general formula (4):

General formula (1)

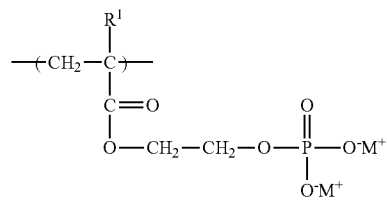

wherein, in the general formula (1), $R^1$ represents either of a hydrogen atom and a methyl group; and $M^+$ represents an alkali metal ion, an organic amine ion or a hydrogen ion, one-half or more of the $M^+$ in the copolymer is an alkali metal ion or an organic amine ion, and the remainder is a hydrogen ion;

General formula (2)
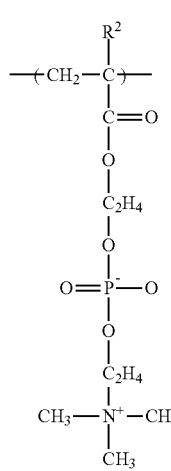
wherein, in the general formula (2), $R^2$ represents either of a hydrogen atom and a methyl group; and
General formula (4)
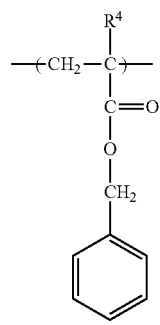
wherein, in the general formula (4), $R^4$ represents either of a hydrogen atom and a methyl group.
* * * * *

UNITED STATES PATENT AND TRADEMARK OFFICE
CERTIFICATE OF CORRECTION

| | |
|---|---|
| PATENT NO. | : 9,688,871 B2 |
| APPLICATION NO. | : 14/202284 |
| DATED | : June 27, 2017 |
| INVENTOR(S) | : Masayasu Nonogaki et al. |

It is certified that error appears in the above-identified patent and that said Letters Patent is hereby corrected as shown below:

On the Title Page

Replace item (54) with the following:
--(54) INKJET RECORDING INK AND INK CARTRIDGE USING THE INK, INKJET RECORDING APPARATUS, INKJET RECORDING METHOD AND INK RECORDED MATTER--.

In the Specification

Replace title at Column 1, Lines 1-5, with the following:
--INKJET RECORDING INK AND INK CARTRIDGE USING THE INK, INKJET RECORDING APPARATUS, INKJET RECORDING METHOD AND INK RECORDED MATTER--.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*